(12) United States Patent
Yu et al.

(10) Patent No.: US 11,915,684 B2
(45) Date of Patent: *Feb. 27, 2024

(54) METHOD AND ELECTRONIC DEVICE FOR TRANSLATING SPEECH SIGNAL

(71) Applicant: SAMSUNG ELECTRONICS CO., LTD., Suwon-si (KR)

(72) Inventors: Ji-sang Yu, Seoul (KR); Sang-ha Kim, Seoul (KR); Jong-youb Ryu, Hwaseong-si (KR); Yoon-jung Choi, Seoul (KR); Eun-kyoung Kim, Suwon-si (KR); Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,019

(22) Filed: Jan. 26, 2022

(65) Prior Publication Data
US 2022/0148567 A1 May 12, 2022

Related U.S. Application Data

(63) Continuation of application No. 16/163,789, filed on Oct. 18, 2018, now Pat. No. 11,264,008.

(30) Foreign Application Priority Data

Oct. 18, 2017 (KR) .......................... 10-2017-0135244

(51) Int. Cl.
*G10L 15/00* (2013.01)
*G10L 13/04* (2013.01)
(Continued)

(52) U.S. Cl.
CPC ............ *G10L 15/005* (2013.01); *G06F 40/58* (2020.01); *G10L 13/04* (2013.01); *G10L 13/00* (2013.01); *G10L 15/26* (2013.01)

(58) Field of Classification Search
CPC ....... G10L 15/00; G10L 15/005; G10L 13/04; G10L 13/00; G10L 15/26; G06F 40/58
See application file for complete search history.

(56) References Cited

U.S. PATENT DOCUMENTS

| | | |
|---|---|---|
| 5,873,055 A | 2/1999 | Okunishi |
| 6,278,968 B1 | 8/2001 | Franz et al. |

(Continued)

FOREIGN PATENT DOCUMENTS

| | | |
|---|---|---|
| CN | 101542474 A | 9/2009 |
| CN | 102306464 A | 1/2012 |

(Continued)

OTHER PUBLICATIONS

Communication dated Mar. 9, 2022 issued by Intellectual Property India in counterpart Indian Application No. 202027013855.
(Continued)

*Primary Examiner* — Michael Colucci
(74) *Attorney, Agent, or Firm* — Sughrue Mion, PLLC

(57) ABSTRACT

A method and an electronic device for translating a speech signal between a first language and a second language with minimized translation delay by translating fewer than all words of the speech signal according to a level of understanding of the second language by a user that receives the translation.

16 Claims, 17 Drawing Sheets

(51) Int. Cl.
  *G06F 40/58*  (2020.01)
  *G10L 15/26*  (2006.01)
  *G10L 13/00*  (2006.01)

(56)  References Cited

U.S. PATENT DOCUMENTS

| | | | |
|---|---|---|---|
| 6,424,362 | B1 | 7/2002 | Bornstein et al. |
| 6,751,776 | B1 | 6/2004 | Gong |
| 6,952,665 | B1 | 10/2005 | Shimomura et al. |
| 6,993,473 | B2 * | 1/2006 | Cartus .................. G06F 40/166 704/5 |
| 7,539,619 | B1 | 5/2009 | Seligman et al. |
| 8,868,419 | B2 | 10/2014 | Cao et al. |
| 8,923,618 | B2 | 12/2014 | Kutsumi |
| 8,954,333 | B2 * | 2/2015 | Chino .................. G10L 15/1822 704/275 |
| 9,367,541 | B1 * | 6/2016 | Servan .................. G06F 40/295 |
| 9,552,354 | B1 * | 1/2017 | Seligman .................. G06F 40/51 |
| 9,588,967 | B2 | 3/2017 | Kamatani et al. |
| 2004/0267527 | A1 * | 12/2004 | Creamer .................. G10L 15/26 704/235 |
| 2006/0271352 | A1 | 11/2006 | Nikitin et al. |
| 2008/0300872 | A1 * | 12/2008 | Basu .................. H04N 7/147 704/235 |
| 2009/0144048 | A1 | 6/2009 | Dvorin et al. |
| 2010/0204981 | A1 * | 8/2010 | Ribeiro .................. G06F 40/58 704/8 |
| 2011/0134910 | A1 * | 6/2011 | Chao-Suren ........ H04L 12/1827 370/352 |
| 2012/0179449 | A1 * | 7/2012 | Raskino .................. G06F 16/345 709/206 |
| 2013/0142365 | A1 | 6/2013 | Lord et al. |
| 2013/0144619 | A1 * | 6/2013 | Lord .................. H04M 3/56 704/235 |
| 2013/0297284 | A1 * | 11/2013 | Choi .................. G06F 40/40 704/2 |
| 2014/0343919 | A1 * | 11/2014 | Kapoor .................. G06F 9/454 704/2 |
| 2015/0088485 | A1 * | 3/2015 | Alhabobi .................. G06F 40/58 704/2 |
| 2015/0178274 | A1 * | 6/2015 | Tanaka .................. G06F 40/58 704/2 |
| 2015/0262209 | A1 * | 9/2015 | Orsini .................. G06F 40/253 705/14.11 |
| 2016/0078020 | A1 | 3/2016 | Sumita et al. |
| 2016/0343272 | A1 * | 11/2016 | Roche .................. G09B 5/04 |
| 2017/0116187 | A1 | 4/2017 | Erickson et al. |
| 2017/0242847 | A1 | 8/2017 | Li et al. |
| 2017/0322819 | A1 | 11/2017 | Melange |
| 2017/0371869 | A1 * | 12/2017 | Zhang .................. G06F 40/51 |
| 2018/0011843 | A1 | 1/2018 | Lee et al. |
| 2018/0373974 | A1 * | 12/2018 | Ahn .................. G06Q 10/10 |

FOREIGN PATENT DOCUMENTS

| | | |
|---|---|---|
| CN | 103093252 A | 5/2013 |
| CN | 103530285 A | 1/2014 |
| CN | 104010267 A | 8/2014 |
| CN | 107079069 A | 8/2017 |
| CN | 107590135 A | 1/2018 |
| EP | 2770445 A2 | 8/2014 |
| JP | 9-6787 A | 1/1997 |
| JP | 9-81597 A | 3/1997 |
| JP | 2009-81567 A | 4/2009 |
| JP | 2016-206929 A | 12/2016 |
| JP | 2017-146587 A | 8/2017 |
| KR | 10-2011-0032394 A | 3/2011 |
| KR | 10-2013-0123038 A | 11/2013 |

OTHER PUBLICATIONS

Communication dated Feb. 23, 2023, issued by the European Patent Office in counterpart European Application No. 18 867 918.7.
Communication dated Jul. 19, 2022 by the Korean Intellectual Property Office for Korean Patent Application No. 10-2017-0135244.
Communication dated Jul. 21, 2020, from the European Patent Office in counterpart European Application No. 18867918.7.
Communication dated Dec. 24, 2021 by the Korean Intellectual Property Office in Korean Patent Application No. 10-2017-0135244.
Communication dated Oct. 22, 2021 by the European Patent Office in European Patent Application No. 18867918.7.
International Search Report dated Jan. 23, 2019 issued by the International Searching Authority in counterpart International Application No. PCT/KR2018/012261 (PCT/ISA/220, PCT/ISA/210, PCT/ISA/237).
Office Action dated May 20, 2023 by the Chinese Patent Office in corresponding CN Patent Application No. 201880067170.8.
Communication dated Oct. 18, 2023 by the China National Intellectual Property Administration for Chinese Patent Application No. 201880067170.8.

* cited by examiner

METHOD AND ELECTRONIC DEVICE FOR TRANSLATING SPEECH SIGNAL

CROSS-REFERENCE TO RELATED APPLICATION

This application is a continuation application of U.S. patent application Ser. No. 16/163,789 filed on Oct. 18, 2018, which is based on and claims priority under 35 U.S.C. § 119 to Korean Patent Application No. 10-2017-0135244, filed on Oct. 18, 2017, in the Korean Intellectual Property Office, the disclosures of which are incorporated by reference herein in their entireties.

BACKGROUND

1. Field

The disclosure relates to a method and an electronic device for translating a first speech signal of a first user into a second language for a second user.

2. Description of the Related Art

Interpretation or translation may be performed for a conversation between a first user and a second user using different languages. Here, interpretation refers to conversion of a speech signal formed in a first language into a 'speech,' which is a speech signal formed in a second language, and translation refers to conversion of a speech signal formed in the first language into a 'text' formed in the second language. Hereinafter, recognition of a speech signal and interpretation or translation thereof will be referred to as 'speech translation' altogether.

Conventionally, to manage a conversation between a first user and a second user who speak different languages, a third party interpreter hears a first speech of the first user, translates the first speech into second speech of a second language, and speaks the second speech to the second user. Accordingly, the second user may understand speech of the first user by listening to the first speech signal translated into the second speech signal in the second language via the interpreter.

In recent years, as an automatic speech recognition technique and a machine translation technique have been developed, electronic devices equipped with a speech translation capability for recognizing a speech signal, automatically translating the speech signal, and outputting a translated result are being produced.

A speech translation technique for automatically translating between a first user and a second user using different languages may include speech recognition, translation, and speech synthesis.

When a speech signal is input to an electronic device that performs speech translation, speech recognition is performed on the input speech signal and a first language-based text is generated as a result of the speech recognition. In a translation stage, the electronic device generates a second language-based text by translating the first language-based text into text of the second language. Subsequently, the electronic device converts the second language-based text into a speech signal in the second language in a speech synthesis stage. Then, the electronic device outputs the speech signal in the second language through a speaker. In this automatic speech translation technique, machine translation using an artificial intelligence (AI) system may be used.

In the above-described automatic speech translation technique, time and processing resources are necessary to perform the speech recognition stage, the translation stage, and the speech synthesis stage. Accordingly, minimizing unnecessary time from among time occurring in performing at least one of the speech recognition stage, the translation stage, and the speech synthesis stage is important to quickly provide a translated result in real time. It is also important to provide accurate translated results. Here, the unnecessary time from among time occurring in performing at least one of the speech recognition stage, the translation stage, and the speech synthesis stage may be referred to as a delay time.

Therefore, for providing a method and an apparatus for automatic speech translation, the delay time that may occur from reception of a speech signal to output of a translated result should be minimized.

SUMMARY

Provided are a method and an electronic device for translating a speech signal, capable of minimizing delay time that may occur between reception of a speech signal to be translated and output of a translated result.

Provided are a method and an electronic device for translating a speech signal, capable of outputting a translated result optimized for a level of language understanding of a user, who is provided with the translated result, based on a translation level learned according to language proficiency of the user.

Provided are a method and an electronic device for translating a speech signal, capable of providing a summarization service optimized to a user and a translation circumstance, like when an interpreter performs simultaneous interpretation.

Additional aspects will be set forth in part in the description which follows and, in part, will be apparent from the description, or may be learned by practice of the presented embodiments.

In accordance with an aspect of the disclosure, there is provided a method of translating a first speech signal in a first language of a first user into a second speech signal in a second language of a second user including receiving the first speech signal; determining a first translation level to be applied to translation of the first speech signal based on first information related to the second user, translating the first speech signal into the second speech signal according to the translation level; and outputting the second speech signal.

In detail, the first information may include information indicating a level of understanding of the first language by the second user.

The first information may include information about at least one of age, gender, education, occupation, nationality, and language proficiency test score of the second user.

The first translation level may include information indicating a degree of summarization or omission of at least one word included in the first speech signal.

The determining may include setting a plurality of translation levels distinguished according to degrees of summarization or omission for translating the first speech signal; and selecting the first translation level from among the plurality of translation levels based on the first information.

The first information may include at least one of a history of previous translations, personal information of the second user, information about an environment in which translation is performed, and information input by the second user in response to reception of the first speech signal.

The translating of the first speech signal into the second language may include determining the first translation level based on utterance characteristics of the first user.

The first information may include a translation history related to the second user, and the method may further include learning the translation history related to the second user and updating the first information based on the learned translation history.

The method may further include transmitting the second speech signal in the second language to an external electronic device through a communication network.

In accordance with an aspect of the disclosure, there is provided an electronic device for translating a first speech signal in a first language of a first user into a second speech signal in a second language of a second user, including a receiver configured to receive the first speech signal; a processor configured to determine a first translation level to be applied to translation of the first speech signal based on first information related to the second user, and translate the first speech signal into the second speech signal according to the first translation level; and an output unit configured to output the second speech signal.

In detail, the first information may include information indicating a level of understanding of the first language by the second user.

The first information may include information about at least one of age, gender, education, occupation, nationality, and language proficiency test score of the second user.

The first translation level may include information indicating a degree of summarization or omission of at least one word included in the first speech signal.

The processor may be further configured to set a plurality of translation levels distinguished according to degrees of summarization or omission for translating the first speech signal, and select the first translation level from among the plurality of translation levels based on the first information.

The first information may include at least one of a history of previous translations, personal information of the second user, information about an environment in which translation is performed, and information input by the second user in response to reception of the first speech signal.

The processor may be further configured to determine the first translation level based on utterance characteristics of the first user.

The first information may include a translation history related to the second user, and the processor may be further configured to learn the translation history related to the second user and update the first information based on the learned translation history.

The processor may be further configured to generate a speech-synthesized translated result through speech synthesis on a translated result in the second language, and the output unit may include at least one of a display for displaying a user interface screen including text data translated into the second language and an audio unit for outputting the speech-synthesized translated result.

The electronic device may further include a communicator configured to perform data transmission and reception between the electronic device and an external electronic device under the control of the processor. The communicator may be further configured to transmit the second speech signal in the second language to the external electronic device.

In accordance with another aspect of the disclosure, there is provided a non-transitory computer-readable recording medium having recorded thereon a program including instructions executable by a computer. Here, the program may include instructions which, when executed by the computer, cause the computer to perform a method of translating a first speech signal in a first language of a first user into a second speech signal in a second language of a second user, the method including receiving the first speech signal; determining a first translation level to be applied to translation of the first speech signal based on first information related to the second user, and translating the first speech signal into the second speech signal based on a result of the determining; and outputting the second speech signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments of the disclosure may be described in terms of functional block components and various processing steps. Such functional blocks may be realized by any number of hardware and/or software components configured to perform the specified functions. For example, the functional blocks of the disclosure may be implemented with one or more microprocessors or circuit configurations for certain functions. Also, the functional blocks of the disclosure may be implemented with any programming or scripting language. Functional blocks may be implemented in algorithms that are executed on one or more processors. Furthermore, the disclosure may employ any number of existing techniques for electronics configuration, signal processing, and/or data processing.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Expressions such as "at least one of," when preceding a list of elements, modify the entire list of elements and do not modify the individual elements of the list. For example, the expressions "at least one of a, b, and c" and at least one of a, b, and/or c" should be understood as including only a, only b, only c, both a and b, both a and c, both b and c, or all of a, b, and c.

In addition, the terms "-er", "-or", and "module" described in the specification mean units for processing at least one function and operation and may be implemented by hardware components or software components and combinations thereof. A "unit" and a "module" may be embodied by a program stored on a storage medium that can be addressed and that may be executed by a processor.

For example, a "unit" and a "module" may include be implemented by components, such as software components, object-oriented software components, class components, and task components, processes, functions, attributes, procedures, subroutines, segments of program codes, drivers, firmware, microcodes, circuits, data, databases, data structures, tables, arrays, and variables, as will be appreciated by those of skill in the art.

Figure 1:
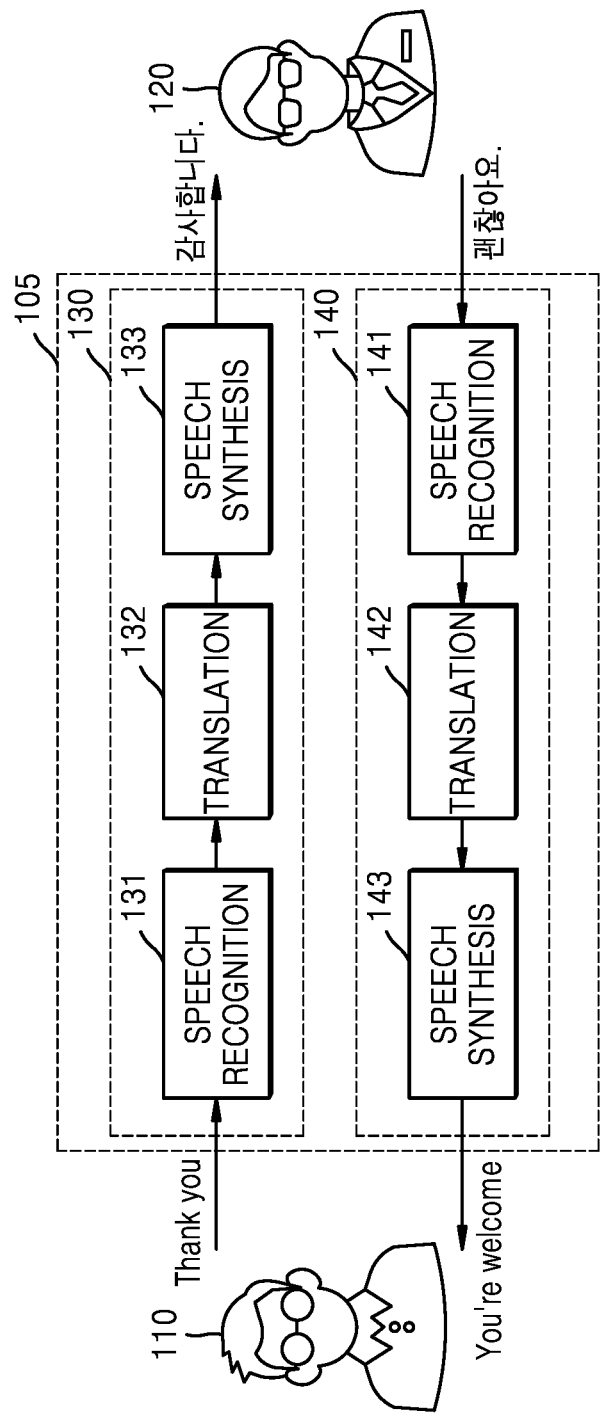
FIG. 1 is a diagram for describing an automatic speech translation technique used in the disclosure.

FIG. 1 is a diagram for describing an automatic speech translation technique used in the disclosure.

A speech translation technique or a speech interpretation technique is a technique for recognizing a speech signal composed in an input first language and for translating a recognized speech signal into a second language. Speech translation refers to outputting a translated result as a text, and speech interpretation refers to outputting a translated result as audible speech. Therefore, speech translation and speech interpretation are the same for translating a recognized speech signal into another language and only output translated results in different ways.

Hereinafter, for convenience of explanation, both speech translation and speech interpretation will be referred to as 'speech translation.' Also, a speech translation technique provided by an electronic device will be referred to as an 'automatic speech translation service.'

Referring to FIG. 1, a first user 110 is a person speaking a first language, and a second user 120 is a person understanding a second language. Also, the first user 110 and the second user 120 are speakers who use different languages to communicate with each other. Hereinafter, a case in which the first language is English and the second language is Korean will be exemplified. Also, blocks 130 and 140 indicate operations of an electronic device 105 providing a speech translation function.

Although the electronic device 105 is shown as one block in FIG. 1, the electronic device 105 providing an automatic speech translation service may include a plurality of physically distinct electronic devices. For example, an automatic speech translation service may be performed by using both an electronic device of the first user 110 (e.g., a smart phone owned by the first user 110) and an electronic device of the second user 120 (e.g., a smart phone owned by the second user 120).

Referring to FIG. 1, the first user 110 utters 'Thank you' in English, which is the first language. The electronic device 105 receives a speech signal 'Thank you' and performs speech recognition on the received speech signal (operation 131). Then, 'Thank you,' which is speech-recognized in operation 131, is translated into Korean, which is the second language (operation 132). Here, a translated result will be '감사합니다.' Subsequently, the electronic device 105 performs a speech synthesis operation to output the translated result '감사합니다' LI as a speech signal (operation 133). Accordingly, the electronic device 105 may provide a speech signal '감사합니다' to the second user 120.

The second user 120 may hear the speech signal '감사합니다' output by the electronic device 105 and utter '괜찮아요' in response thereto. Then, the electronic device 105 recognizes the speech '괜찮아요' uttered by the second user 120 (operation 141) and translates the speech into English, which is the first language (operation 142). Here, a translated result will be 'You're welcome.' Subsequently, the electronic device 105 performs a speech synthesis operation to output the translated result 'You're welcome' as a speech signal (operation 143). Accordingly, the electronic device 105 may provide a speech signal 'You're welcome' to the first user 110.

In general, an automatic speech translation technique automatically speech-recognizes all input speech signals and performs translation on all recognized speech signals.

However, in some cases, there may be an unnecessary time period elapsed for performing at least one of speech recognition, translation, and speech synthesis. For example, when the second user 120 understands the meaning of 'Thank you' in the first language, an operation for translating 'Thank you' to '감사합니다' and providing a translated result to the second user 120 becomes an unnecessary operation, and thus time periods elapsed for operations for outputting a translated result (operations 131, 132, and 133) may be unnecessary.

In FIG. 1, the translation of a simple expression 'Thank you' is exemplified. However, in the case of translating a long sentence or a plurality of successive sentences uttered by the first user 110, and the second user 120 understands the meaning of a part or all of the long sentence or the successive sentences, translation on the part of the speech uttered by the first user 110 that the second user 120 understands may be unnecessary. Also, a part of at least one sentence uttered by the first user 110 may be insignificant and omissible and may not needed to be translated.

Hereinafter, with reference to the accompanying drawings, a method and an electronic device for translating a speech signal capable of more quickly providing a translated result by minimizing a time period elapsed for performing speech translation on an unnecessary portion of input speech, as described above, will be described in detail. In detail, a method and an electronic device for translating a speech signal according to an embodiment of the disclosure may omit or summarize translation for an expression that a user understands or a portion that is unnecessary to the user. As a result, a time period elapsed for unnecessary translation may be reduced, and thus a translated result may be more quickly output in real time.

An electronic device according to an embodiment of the disclosure translates a first speech signal of a first user into a second language and provides a translated result to a second user. In detail, an electronic device according to an embodiment of the disclosure may be any electronic device capable of providing an automatic speech translation service.

In detail, the electronic device 200 may be, but is not limited to, a mobile computing device or a non-mobile computing device, e.g., a wearable device, a smart phone, a tablet PC, a PC, a smart TV, a personal digital assistant (PDA), a laptop computer, a media player, a global positioning system (GPS) device, an e-book terminal, a digital broadcasting terminal, a navigation device, a kiosk, an MP3 player, a digital camera, an electronic control device of an automobile, a central information display (CID), etc.

An artificial intelligence (AI) system may be applied to the automatic speech translation service provided by a method and an electronic device for translating a speech signal according to the disclosure.

An AI system is a computer system that a computer device improves accuracy of results of operations or calculations by learning and determining.

As an AI system is repeatedly used, the AI system is capable of improving the accuracy of results of calculations thereby through learning and more accurately reflecting the intention of a user. Therefore, previous rule-based smart systems are gradually being replaced with a deep learning-based AI systems.

An AI technique may be considered as a technique that uses machine learning, and deep learning may be considered as a type of machine learning. Deep learning is an algorithmic technique for autonomously classifying and learning the characteristics of input data. An element technique is a technique for simulating functions of the human brain including recognition and determination by utilizing machine learning algorithms like deep learning and includes technical fields like linguistic understanding, visual understanding, reasoning/prediction, knowledge representation, and motion control.

Various fields in which AI technique is applied are as follows. Linguistic understanding is a technique for recognizing, applying, and processing human languages/characters and includes natural language processing, machine translation, a dialogue system, a query response, speech recognition, and/or synthesis. Visual understanding is a technique for recognizing and processing objects in a manner similar to that of human vision and includes object recognition, object tracking, image searching, human recognition, scene understanding, space understanding, and image enhancement. Reasoning/prediction is a technique to determine information for logical reasoning and prediction and includes knowledge/probability-based reasoning, optimization prediction, preference-based planning, and recommendation. Knowledge representation is a technique for automating human experience information into knowledge data and includes knowledge building (data generation/categorization) and knowledge management (data utilization). Motion control is a technique for controlling autonomous driving of a vehicle and a motion of a robot and includes motion control (navigation, collision avoidance, driving), manipulation control (behavior control), etc.

Hereinafter, a method and an electronic device for translating a speech signal capable of minimizing a delay time and providing a translated result more consistent with a user's intention by applying such an AI system using, e.g., an AI system using a neural network, will be described in detail.

Figure 2:
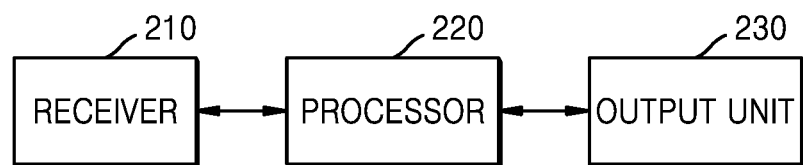
FIG. 2 is a block diagram showing an electronic device according to an embodiment of the disclosure.

FIG. 2 is a block diagram showing an electronic device according to an embodiment of the disclosure.

Referring to FIG. 2, an electronic device 200 is an electronic device for translating a first speech signal, which is uttered by a first user in a first language, into a second speech signal of a second language and providing a translated result (the second speech signal in the second language) to a second user. The electronic device 200 includes a receiver 210, a processor 220, and an output unit 230. Here, each of the first user and the second user may be one of a plurality of users communicating with one another in different languages. Hereinafter, for convenience of explanation, an example in which an automatic speech translation service is provided between a first user using a first language and a second user using a second language will be described. In other words, the first user becomes a person who utters a speech signal to be translated, and the second user becomes a person who is provided with a translated result.

The receiver 210 receives a first speech signal, which includes at least one word and is in the first language. Particularly, the receiver 210 includes a microphone and may receive the first speech signal through the microphone. Here, the first speech signal received by the receiver 210 becomes an input for speech recognition and translation.

Here, the term 'word' may refer to the minimum unit of words that has independence, separability, and a certain meaning. In detail, the 'word' is the minimum unit of words that may be interpreted through translation. Therefore, translation may be performed word-by-word, and omission of translation or summarization of translation may be done word-by-word.

Translation may also be performed phrase-by-phrase or sentence-by-sentence. Accordingly, omission of translation or summarization of translation may also be performed phrase-by-phrase or sentence-by-sentence. Since a phrase or a sentence includes at least one word, translation may be performed for at least one word and omission or summarization of translation may also be performed for at least one word.

Therefore, each of translation, omission of translation, and summarization of translation may be performed for at least one word. Therefore, it will be described below that each of translation, omission of translation, and summarization of translation is performed for at least one word.

In other words, descriptions below will be given based on the 'word' as a unit by which translation is omitted and a unit by which translation is performed, but translation, omission of translation, or summarization of translation may also be performed by a unit of a group including at least one word, e.g., a phrase, a sentence, etc.

The processor 220 may determine a translation level to be applied to translation of the first speech signal based on first information, which is information related to the second user, and translate the first speech signal into the second language according to the translation level. For example, the processor 220 may determine a translation level to be applied to translation of the first speech signal as a first translation level based on the first information. Next, the processor 220 translates the first speech signal into the second language based on the translation level. In the above-mentioned example, the processor 220 translates the first speech signal into the second language based on the first translation level.

Also, the processor 220 may determine whether to omit translation of at least one word included in the first speech signal based on the first information, which is information related to the second user. Next, the processor 220 may translate the first speech signal into the second language based on a result of the determination.

In detail, the processor 220 may speech-recognize the first speech signal and translate the first speech signal, which is speech-recognized, into the second language based on the first information. Subsequently, the processor 220 may perform speech synthesis on a result of the translation into the second language and output speech-synthesized translated result.

Here, the processor 220 performs machine translation on speech recognition data, which is a speech-recognized first speech signal.

Also, the processor 220 may control the components of the electronic device 200 to perform operations needed for providing an automatic speech translation service, operations including at least one of speech reception, speech recognition, speech translation, and speech output.

In detail, the processor 220 performs translation through an artificial neural network, which is a neural network used in the field of artificial intelligence (AI). An artificial neural network computes an input signal through a plurality of layers, performs learning based on computed result values, and reduces errors based on a result of the learning. Therefore, a highly accurate translated result may be output. Here, the learning may include machine learning. In detail, deep learning, which is a machine learning using an artificial neural network, may be used.

In detail, an artificial neural network may include a plurality of layers. Each layer outputs a translated result corresponding to a first speech signal by applying a kernel including a weight to a first speech signal, which is an input signal. Here, weights used in the respective layers may be renewed through learning of the artificial neural network.

In detail, the processor 220 may receive first information and a first speech signal as input signals, learn using the first information and the first speech signal, and classify the language understanding level of the second user regarding the first speech signal. The processor 220 repeatedly learns and classifies the language understanding level of the second user regarding at least one word included in the first speech signal based on calculations through the layers and performs translation by omitting at least one word of the at least one word included in the first speech signal based on a result of learning.

Also, the processor 220 may learn such that a result of an omitted or summarized translation has a naturally connected sentence structure. Therefore, a translated result that is correctly summarized in correspondence to the language understanding level of the second user may be generated.

Performing a translation operation through a plurality of layers included in an artificial neural network will be described below in detail with reference to FIG. 11.

The output unit 230 outputs a translated result in the second language. The output unit 230 may include at least one of an audio device for outputting audio data and a display for outputting image data.

In detail, when the output unit 230 includes an audio device, the audio device may output a result of a speech synthesis performed by the processor 220 as an audio signal that the user may audibly recognize. Alternatively, when the output unit 230 includes a display, the display may display a user interface screen including text data, which is a translated result. In detail, the receiver 210 may receive a first speech signal or an audio signal including a first speech signal. For example, the audio signal may be a signal including ambient sound and ambient noise generated in an environment where a first user is uttering and a speech signal of the first user.

When the receiver 210 receives and transmits the first speech signal to the processor 220, the processor 220 may perform speech recognition on the first speech signal. In detail, when an audio signal component other than the first speech signal is received by the receiver 210 together with the first speech signal, the processor 220 may retrieve the first speech signal from received audio signals. Subsequently, the processor 220 may perform speech recognition and translation on the first speech signal. There are various methods of extracting a first speech signal, which is a subject of speech recognition. For example, the receiver 210 may extract a signal component corresponding to the frequency band of a human voice from received audio signals as a first speech signal. Also, the above-stated operation for retrieving a first speech signal may be performed by the receiver 210. In this case, when an audio signal component other than the first speech signal is received together with the first speech signal, the receiver 210 may filter the first speech signal from the received audio signals.

The electronic device 200 may also receive a first speech signal that is received and speech-recognized by an external electronic device. The electronic device 200 may also receive a first speech signal from an external electronic device (e.g., a wireless microphone, a wired microphone, another electronic device, etc.). In this case, the electronic device 200 may receive a first speech signal or a speech-recognized first speech signal through a communicator 450 described below with reference to FIG. 4. In this case, the communicator 450 may transmit the first speech signal or the speech-recognized first signal to the processor 220. When the processor 220 receives the first speech signal, the processor 220 may perform speech-recognition and translation thereon. Alternatively, when the processor 220 receives a speech-recognized first speech signal, the processor 220 may translate the speech-recognized first speech signal.

As described above, an operation for receiving a speech uttered by the first user may be performed by at least one of an external electronic device like an external speech receiving device (e.g., a wireless microphone, a wired microphone, a wearable device, etc.) and an external speech recognition device and the receiver 210.

FIGS. 3A to 3D are diagrams for describing an operation for the electronic device 200 to provide an automatic speech translation service.

A first user 310 shown in each of FIGS. 3A, 3B, 3C and 3D may correspond to the first user 110 of FIG. 1. Furthermore, the electronic device 200 shown in each of FIGS. 3A, 3B, 3C, and 3D is the same as the electronic device 200 of FIG. 2.

In detail, a speech recognition operation refers to an operation for recognizing a speech of a user in a received audio signal by using an automatic speech recognition (ASR) technique.

The electronic device 200 described above with reference to FIG. 2 is a device for performing speech reception, speech recognition, and speech translation, and the speech reception from among operations performed by the electronic device 200 may also be performed through an external electronic device. The speech reception and the speech recognition from among operations performed by the electronic device 200 may also be performed through an external electronic device.

In detail, an external electronic device that performs at least one of the speech reception and the speech recognition and operates in conjunction with the electronic device 200 may be, but is not limited to, a mobile computing device or a non-mobile computing device, e.g., a wearable device, a smart phone, a tablet PC, a PC, a smart TV, a PDA, a laptop computer, a media player, a GPS device, an e-book terminal, a digital broadcasting terminal, a navigation device, a kiosk, an MP3 player, a digital camera, an electronic control device of an automobile, a CID, etc.

The external electronic device may be connected to the electronic device 200 via a wired or wireless network.

Various embodiments in which the electronic device 200 operates in conjunction with an external electronic device to provide an automatic speech translation service will be described below with reference to FIGS. 3A to 3D.

In FIGS. 3A, 3B, 3C, and 3D, a case where the electronic device 200 is a smartphone is exemplified. Also, cases in which an external electronic device that performs at least one of speech reception, speech recognition, and speech translation and operates in conjunction with the electronic device 200 is/are a speech recognition server 320 and/or a wearable device 331 will be exemplified.

Figure 3A:
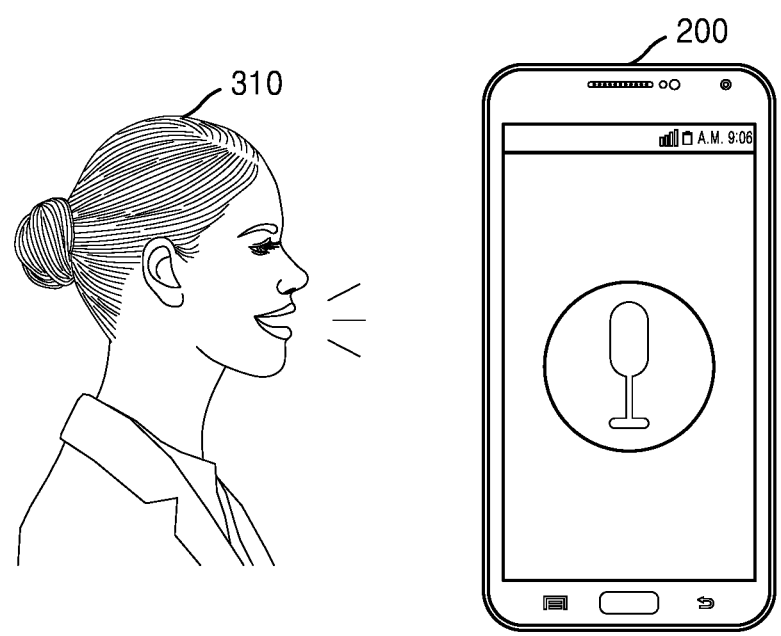
FIGS. 3A, 3B, 3C, and 3D are diagrams for describing an operation for an electronic device to provide an automatic speech translation service.

FIG. 3A shows an example in which the electronic device 200 directly receives a speech signal and provides an automatic translation service.

As described above with reference to FIG. 2, the electronic device 200 receives a first speech signal that is uttered by a speaker and performs speech recognition on the first speech signal.

For example, when a first user utters 'Hello, nice to meet you,' the electronic device 200 receives an audio signal corresponding to a first speech signal 'Hello, nice to meet you' uttered by the first user. Next, the audio signal is speech-recognized, and speech recognition data, which is data corresponding to 'Hello, nice to meet you,' may be obtained. Next, translation is performed on the speech recognition data, and a translated result is output.

Figure 3B:
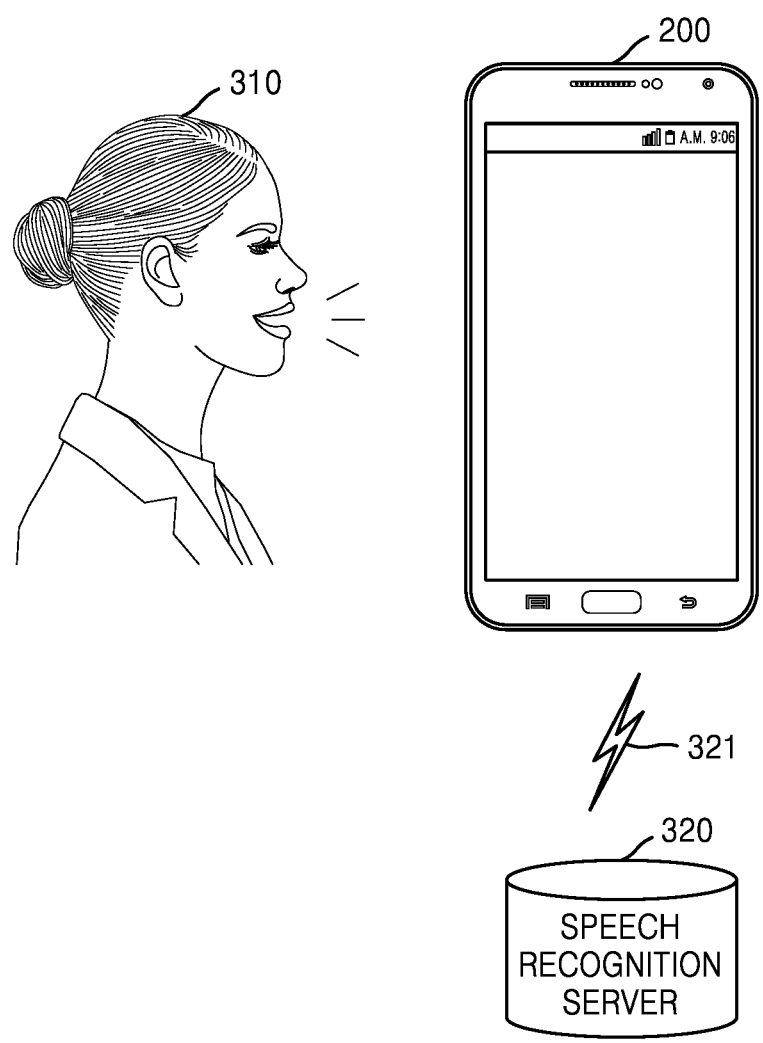

FIG. 3B shows an example in which the electronic device 200 provides an automatic translation service in conjunction with the speech recognition server 320, which is an external electronic device.

Referring to FIG. 3B, the electronic device 200 may receive a speech signal of the first user 310 and transmit the speech signal to the speech recognition server 320. Then, the speech recognition server 320 performs operation 131 for speech recognition, operation 132 for translation, and operation 133 for speech synthesis described above with reference to FIG. 1 and generates a translated result.

In detail, the receiver 210 of the electronic device 200 receives a speech signal of the first user 310. The electronic device 200 may transmit the speech signal to the speech recognition server 320 via an internally provided communicator. Here, the electronic device 200 is connected to the speech recognition server 320 through a network 321. The network 321 is a wired or wireless network and may be a network compliant with a communication standard like Bluetooth, wireless LAN (WLAN), wireless broadband (WiBro), world interoperability for microwave access (WiMAX), CDMA, and WCDMA. Hereinafter, a case in which the electronic device 200 and the speech recognition server 320 transmit and receive certain data through a network conforming to the Wi-Fi communication standard will be exemplified.

The speech recognition server 320 may receive a speech signal from the electronic device 200 via the network 321 compliant with the Wi-Fi communication standard, perform speech recognition and translation on the speech signal, and generate a translated result. Here, the translated result may be text data. In addition, the translated result may be audio data generated through speech synthesis.

Subsequently, the speech recognition server 320 may transmit the translated result to the electronic device 200 via the network 321. Then, the output unit 230 of the electronic device 200 may output the translated result.

Figure 3C:
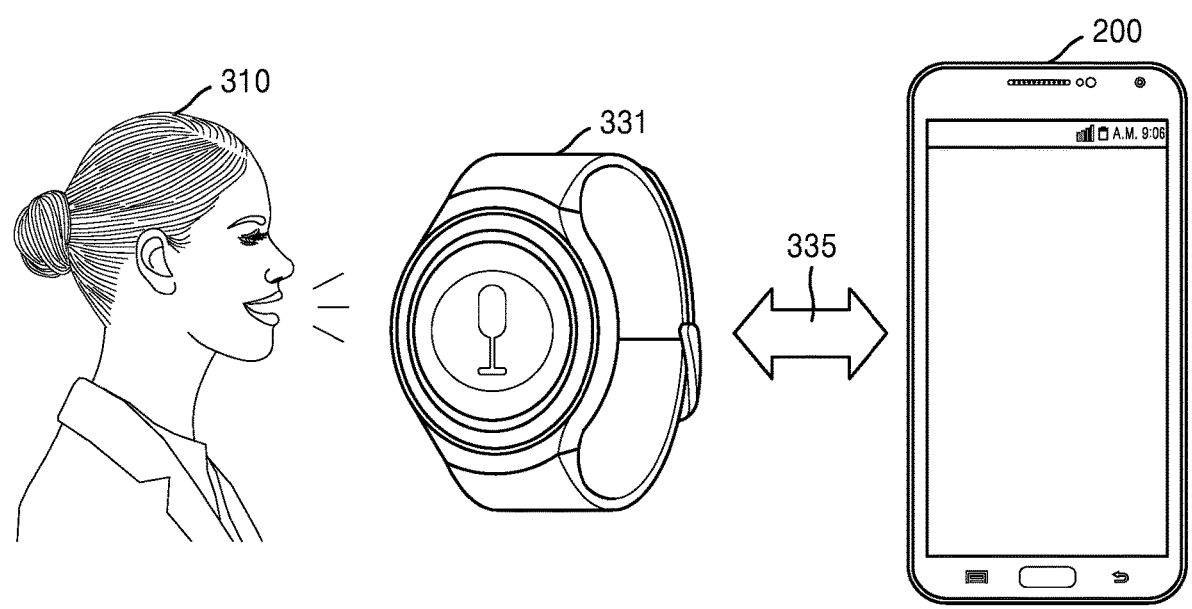

FIG. 3C shows an example of receiving a speech signal through the wearable device 331, which is an external electronic device. In this case, the wearable device 331 may be connected to the electronic device 200 via a network 335, which is via a wire or wireless. The network 335 may correspond to the network 321 described above with reference to FIG. 3B, and thus detailed descriptions thereof will be omitted. FIG. 3C exemplifies a case in which the network 335 is a network compliant with the Bluetooth communication standard.

The wearable device 331, which is an external electronic device, receives a speech signal of the first user 310. The wearable device 331 transmits the speech signal to the electronic device 200 via the network 335, e.g., a network compliant with the Bluetooth communication standard. Then, the electronic device 200 may perform speech recognition and translation on the speech signal and output a translated result. In an embodiment, the electronic device 200 of FIG. 3C may communicate with the server of FIG. 3B to perform speech recognition and translation, as described below.

Figure 3D:
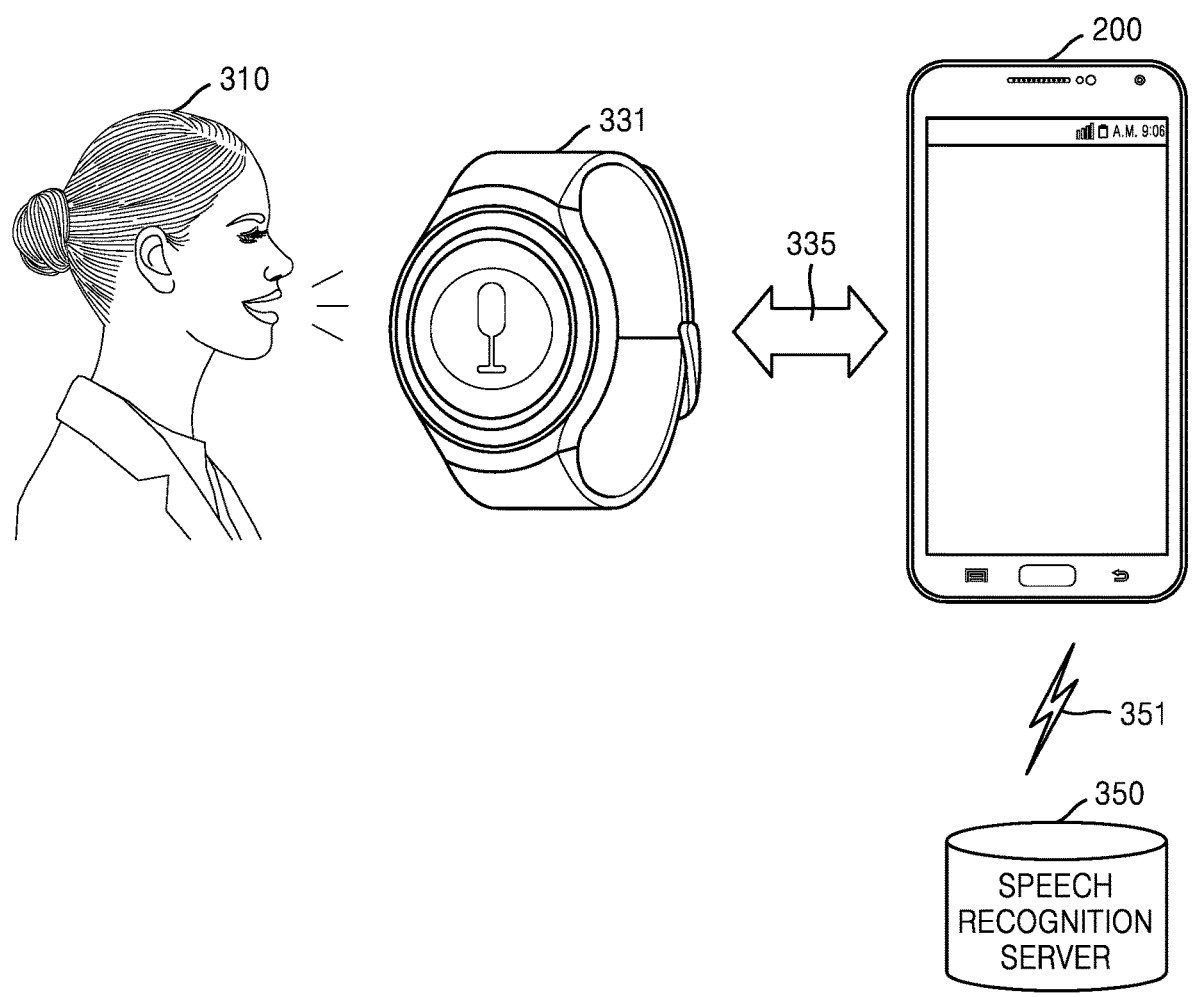

FIG. 3D exemplifies a case in which the electronic device 200 receives a speech signal via the wearable device 331, which is an external electronic device, and transmits the speech signal to the speech recognition server 350 to provide an automatic speech translation service. The speech recognition server 350 and a network 351 shown in FIG. 3D correspond to the speech recognition server 320 and the network 321 shown in FIG. 3C, respectively, and thus detailed descriptions thereof will be omitted.

Referring to FIG. 3D, the wearable device 331, which is an external electronic device, receives a speech signal of the first user 310. The wearable device 331 transmits the speech signal to the electronic device 200 via the network 335, e.g., a network compliant with the Bluetooth communication standard. Subsequently, the electronic device 200 transmits the speech signal to the speech recognition server 350 via the network 351, e.g., a network compliant with the Wi-Fi communication standard. Then, the speech recognition server 350 may generate a translated result by performing speech recognition and translation on the speech signal. Here, the translated result may be text data. In addition, the translated result may be audio data generated through speech synthesis.

Subsequently, the speech recognition server 350 may transmit the translated result to the electronic device 200 via the network 351. Then, the output unit 230 of the electronic device 200 may output the translated result.

Figure 4:
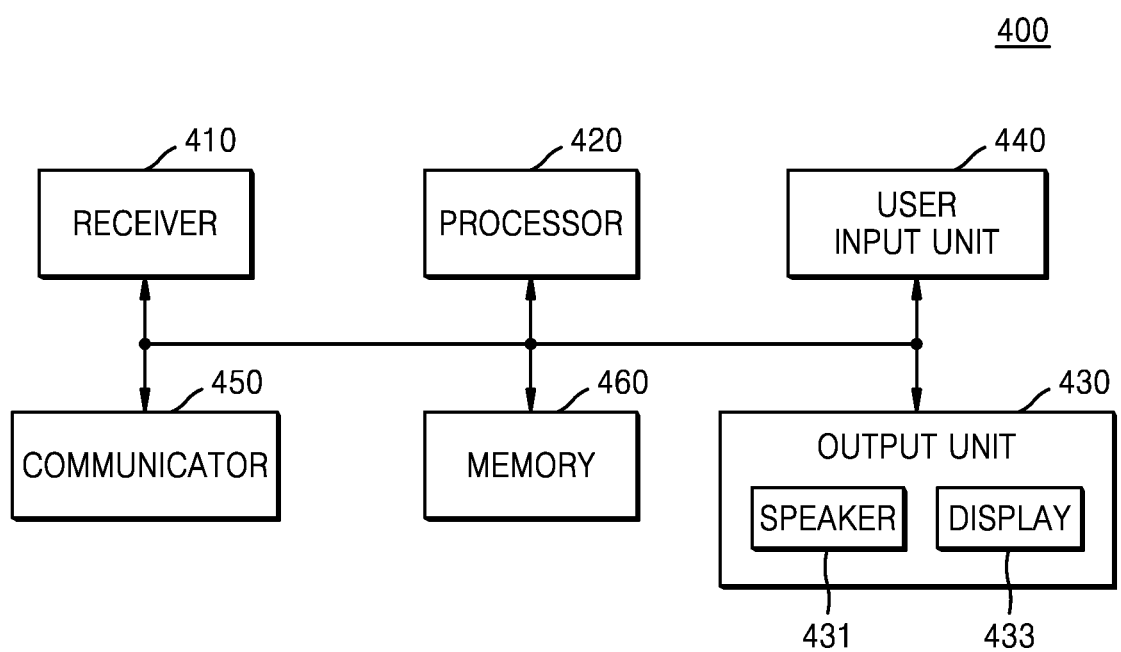
FIG. 4 is a block diagram showing an electronic device according to an embodiment of the disclosure.

FIG. 4 is a block diagram showing an electronic device according to an embodiment of the disclosure.

Referring to FIG. 4, an electronic device 400 includes a receiver 410, a processor 420, and an output unit 430. Also, the electronic device 400 may further include at least one of a user input unit 440, a communicator 450, and a memory 460.

In the electronic device 400 shown in FIG. 4, the receiver 410, the processor 420, and the output unit 430 correspond to the receiver 210, the processor 220, and the output unit 230 of the electronic device 200 shown in FIG. 2, respectively. Therefore, for describing the electronic device 400, descriptions identical to those given above regarding the electronic device 200 of FIG. 2 will be omitted.

The receiver 410 receives a first speech signal, which includes at least one word in the first language. In detail, receiver 410 may include a microphone for receiving a first speech signal.

In detail, the receiver 410 receives the first speech signal of the first user and transmits the first speech signal to the processor 420.

For example, the first user utters the sentence 'Hello, nice to meet you,' and the receiver 410 receives the first speech signal of the first user. Next, the receiver 410 transmits the first speech signal to the processor 420. The processor 420 then speech-recognizes the first speech signal. In the above example, speech recognition data, which is a speech-recognized first speech signal, may be text data corresponding to 'Hello, nice to meet you.' The processor 420 determines whether to omit at least one translation of at least one word included in the first speech signal based on first information, which is information related to a second user, and translates the first speech signal into the second language based on the determination. Here, the first information may be information indicating language understanding, language proficiency, conversation environment, and the like of the second user.

In detail, the processor 420 may generate a translated result corresponding to the first speech signal, which is speech-recognized, through a machine translation (MT). Here, the translated result may be generated as text data. Subsequently, the processor 420 may convert the text data, which is a translated result, into audio data using a text-to-speech (TTS) technique. That is, the processor 420 may perform a speech synthesis, thereby generating audio data corresponding to the translated result.

In detail, the processor 420 may perform translation using an artificial neural network. For generating an output signal corresponding to an input signal, an artificial neural network autonomously learns from processing the input signal through a plurality of layers, such that an accurate output signal may be generated.

Also, the first information may be information indicating whether the second user is capable of understanding the first speech signal, even when translation of at least one word of at least one word included in the first speech signal is omitted. Alternatively, the first information may be information indicating whether omission of translation of at least one word of at least one word included in the first speech signal meets the intention of the second user. In addition, the first information may include information that may be used to determine how much translation is to be summarized considering a request of the second user and/or an environment for performing translation.

In detail, the first information may include information indicating the level of understanding or language proficiency of the second user regarding the first speech signal formed in the first language. The first information may be associated with a profile of the second user.

The first information may be stored in the memory 460 or may be stored in an external server. When the first information is stored in an external server, the processor 420 may obtain the first information from the external server through the communicator 450.

Also, when there are a plurality of users using a speech recognition translation service, first information may be obtained for each of the users.

In addition, the electronic device 400 may continuously update the first information to provide a translated result optimized to the second user. In detail, the electronic device 400 may update the first information by learning through an artificial neural network.

For example, the first speech signal may contain five words: Hello, nice, to, meet, and you. The processor 420 may determine whether to omit translation of at least one of the five words based on the first information. For example, when the second user hears 'Hello' and knows its meaning '안녕' in Korean, the translation of 'Hello' may be omitted. In this case, the processor 420 may generate a translated result '만나서 반가워' by omitting the translation of 'Hello' and translating only the remaining words 'nice to meet you.' Therefore, the electronic device 400 may reduce a period of time for translating and outputting '안녕.'

Also, the first information may include at least one of the second user's personal information, information about the environment in which translation is performed, and information input by the second user in correspondence to reception of the first speech signal. The first information will be described in detail below with reference to FIGS. 5 to 8.

The output unit 430 outputs a translated result in the second language.

In detail, the processor 420 performs speech recognition and translation, thereby generating at least one of audio data and video data including a translated result corresponding to the first speech signal. The processor 420 transmits at least one of the audio data and the video data to the output unit 430. Then, the output unit 430 outputs at least one of the audio data and the video data transmitted from the processor 420 through at least one of an audio device and a display.

The output unit 430 may output only audio data or only video data. The output unit 430 may also output audio data and video data at the same time.

For example, the output unit 430 may include at least one of a speaker 431 and a display 433 capable of outputting audio data and video data, respectively. In detail, the speaker 431 outputs a translated result as an audio signal that the second user may audibly perceive.

The display 433 outputs a user interface screen including text data, which is a result of translation. Alternatively, the display 433 may output a translated result in the form of a subtitle displayed in real time.

The output unit 430 may also transmit a translated result to an external electronic device (e.g., a smart phone, a smart TV, a smart watch, a server, etc.). In this case, the external electronic device may receive at least one of audio data and video data including a translated result and output the translated result to the second user.

The user input unit 440 may receive a user input for controlling the electronic device 400. The user input unit 440 may include, but is not limited to, user input devices including a touch panel for sensing a user's touch, a button for receiving a push manipulation of a user, a wheel for receiving a rotating manipulation of a user, a key board, and a dome switch.

The communicator 450 may communicate with an external electronic device or a server via wired or wireless communication. The communicator 450 according to an embodiment includes at least one communication module like a short-range communication module, a wire communication module, a mobile communication module, a broadcast receiving module, and the like. Here, the at least one communication module refers to a communication module capable of transmitting and receiving data through a network compliant with a communication standard like Bluetooth, wireless LAN (WLAN) (Wi-Fi), wireless broadband (Wi-Bro), world interoperability for microwave access (WiMAX), CDMA, and WCDMA.

In FIG. 4, the communicator 450 is shown as a separate block, but the communicator 450 may also be configured to be included as a component of the receiver 410.

Also, as described above with reference to FIGS. 3B, 3C, and 3D, the communicator 450 of the electronic device 400 may also communicate with an external electronic device or a server via the network 321, 335, or 351. As described above with reference to FIGS. 3B, 3C, and 3D, the electronic device 400 may perform operations for providing an automatic speech translation service in conjunction with an external electronic device or a server connected through a certain network.

The communicator 450 according to an embodiment of the disclosure may receive a first speech signal from an external electronic device. In this case, the communicator 450 may transmit the first speech signal to the processor 420. Then, the processor 420 may speech-recognize the first speech signal.

The memory 460 may store a result of translation performed by the processor 420. The memory 460 may store an audio signal or the first speech signal received via the receiver 410. The memory 460 may receive and store input audio signals on a per-sentence basis, a constant time-length basis, or a constant data-size basis.

The memory 460 according to an embodiment may store computer-readable instructions that are executed in the processor 420 to control the electronic device 400.

The memory 460 according to an embodiment may store first information, which is information about the second user. The memory 460 may also store a speech signal received for performing translation and a result of speech recognition on the speech signal. Also, the memory 460 may store a database including a history of translated results provided to the second user (hereinafter referred to as 'utterance history'). Also, the memory 460 may store a plurality of pieces of first information respectively corresponding to a plurality of users, such as in profiles for each user.

The processor 420 according to an embodiment may determine whether to omit translation of at least one word of at least one word included in the first speech signal based on the first information stored in the memory 460.

The memory 460 according to an embodiment may include at least one type of storage medium from among a flash memory type, a hard disk type, a multimedia card micro type, a card type memory (e.g., an SD memory or an XD memory), random access memory (RAM), static random access memory (SRAM), read only memory (ROM), electrically erasable programmable read-only memory (EEPROM), programmable read-only memory (PROM), a magnetic memory, a magnetic disk, and an optical disc.

Hereinafter, detailed descriptions of operations of a method and an electronic device for translating a speech signal will be given by taking the electronic device 400 shown in FIG. 4 as an example.

Figure 5:
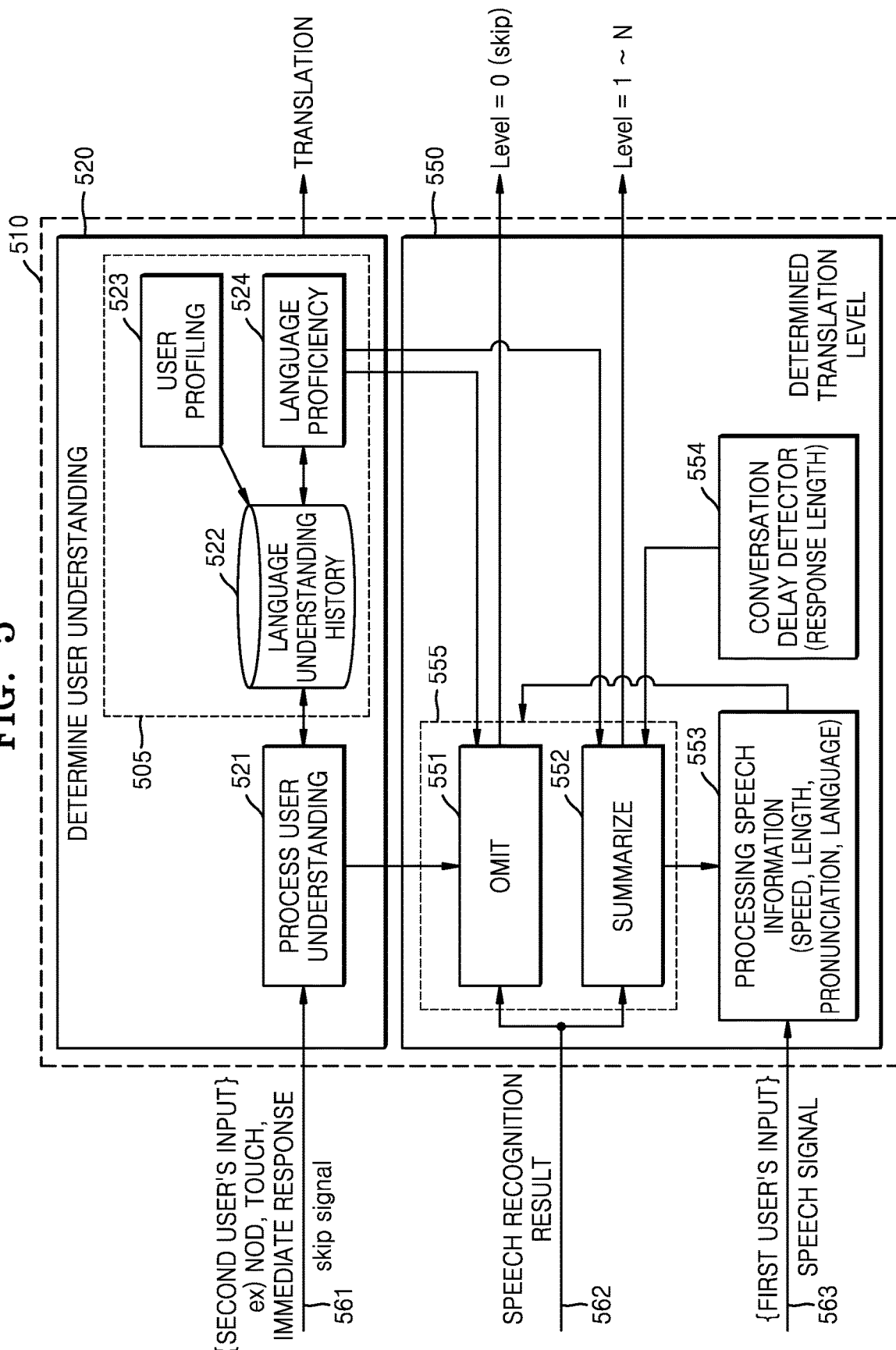
FIG. 5 is a diagram for describing a translating operation according to an embodiment of the disclosure.

FIG. 5 is a diagram for describing a translation operation based on first information according to an embodiment of the disclosure in detail. In FIG. 5, in order to show detailed operations required for performing translation, operations are shown in blocks.

Referring to FIG. 5, the electronic device 400 may determine whether to omit translation of at least one word of at least one word included in a first speech signal based on the first information (operation 510). Here, operation 510 may be performed by the processor 420.

A block 505 is a block for describing first information. As described above, the first information may be information indicating whether the second user may understand the first speech signal formed in the first language even when at least one word of at least one word included in the first speech signal is omitted.

The first information may include at least one of personal information of the second user, information about an environment in which translation is performed, and information input by the second user in response to reception of the first speech signal.

The personal information of the second user will be described in detail below with reference to FIG. 6.

Figure 6:
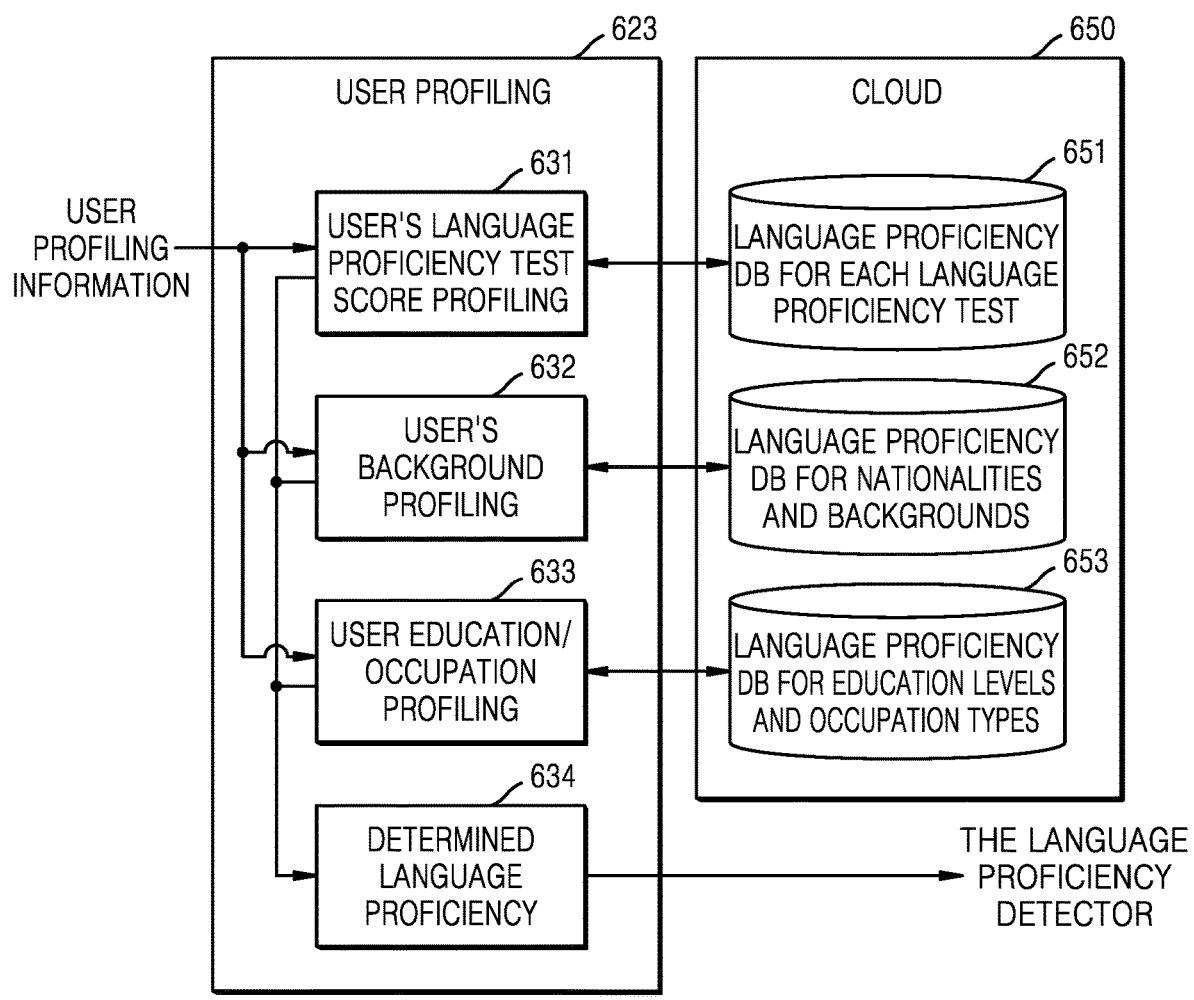
FIG. 6 is a diagram for describing first information used in the disclosure.

FIG. 6 is a diagram for describing personal information of a second user in the first information used in an embodiment of the disclosure in detail.

The personal information of the second user may include information about at least one of age, gender, language score, education, occupation, and nationality of the second user.

Referring to FIG. 6, the personal information of the second user may be obtained by collecting information indicating a level of language understanding of the second user regarding at least one word and/or at least one sentence included in the first speech signal formed in a first language. In FIG. 6, personal information of the second user is referred to as 'user profiling information' as information for profiling a level of understanding of the second user regarding the first language and an embodiment for profiling the level of understanding of the second user regarding the first language according to a plurality of categories.

The electronic device 400 may obtain user profiling information to determine a level of language understanding or a language proficiency of the second user. For example, the electronic device 400 may obtain user profiling information for each of a plurality of users who are provided with translated results and store the user profiling information in the memory 460. In detail, the electronic device 400 may receive user profiling information for each user through the user input unit 440. Alternatively, the electronic device 400 may autonomously collect and obtain user profiling information. The electronic device 400 may also receive user profiling information from an external server.

The user profiling information may be utilized for user's language proficiency test score profiling 631, user's background information profiling 632 indicating the nationality or a living region of a user, and user's education and occupation profiling 633.

The electronic device 400 may determine whether the second user is capable of understanding a word or a sentence included in a first speech signal in a second language based on user profiling 623 referring to a memory device provided internally with or externally from the electronic device 400, e.g., a cloud server 650 to the electronic device 400 via a wired or wireless network. Here, operation for the user profiling 623 may be performed by the processor 420.

Here, the cloud server 650 may include a language proficiency database 651 for language proficiency tests, a language proficiency database 652 for nationalities and backgrounds, and a language proficiency database 653 for educations and occupations.

The language proficiency database 651 for language proficiency tests may classify and store words and sentences that users understand for respective test score ranges of a certain language proficiency test.

In addition, the language proficiency database 652 for nationalities and backgrounds may classify and store words and sentences that users from respective countries and regions (e.g., regions the users are from) understand meanings thereof.

In addition, the language proficiency database 653 for educations and occupations type may classify and store words and phrases that users understand according to at least one of levels of education and types of occupations.

For example, test results of an official English proficiency test of the second user may be included in user profiling information, and the user's language proficiency test score profiling 631 may be within the upper ranks. In this case, the electronic device 400 may refer to the language proficiency database 651 for language proficiency tests and determine that the second user understands at least one of at least one word or sentence included in the first speech signal (operation 634). In detail, operation 634 may be performed by the processor 420.

Particular embodiments of operation 634 will be described below in detail.

For example, the electronic device 400 may use information about the age of the second user as an initial value of a user understanding model, taking newly-coined words for age groups and a mainly spoken language into account. Here, the 'user understanding model' may refer to a model that indicates whether the second user who is provided with a translated result is capable of understanding the meaning of speech signal including at least one word or sentence without providing the translated result. For example, the electronic device 400 may determine that the second user understands the name of a singer who is commonly popular among people in their twenties without a translation. In this case, the electronic device 400 may omit translation for the name of a corresponding singer.

In addition, the electronic device 400 may use information about the gender of the second user as an initial value of the user understanding model by classifying interests according to men and women and relating the information about the gender of the second user thereto. For example, since a man in his twenties is highly interested in games and a woman in her twenties is highly interested in cosmetics, it may be determined that, when the second user is a man in his twenties, the second user already understands the word 'game' and, when the second user is a woman in her twenties, the second user already understand the word "cosmetics.'

In addition, the electronic device 400 may use information about a level of the language proficiency of the second user as an initial value of a user understanding model for recognizing expressions that do not need to be translated according to levels of language proficiency levels.

In addition, the electronic device 400 may use the information about education of the second user as an initial value of a model indicating a level of understanding sentences by difficulty levels according to levels of education. For example, in the case of a university student, the probability of translation of an elementary student level sentence may be low. Therefore, when the second user is a university student, the electronic device 400 may decide to omit translation of words and/or sentences used in English language education for elementary students.

In addition, the electronic device 400 may classify technical terms for occupations based on information about the occupation of the second user and use the classified technical terms as an initial value of the user's understanding model to be stored. For example, when the second user is a cardiologist, it may be determined that the second user understands cardiology-related technical terms formed in the first language, and thus translation thereof may be omitted.

Also, based on information about a country or nationality of the second user, the electronic device 400 may determine that the second user understands words frequently in the corresponding country without translation. Therefore, the electronic device 400 may decide to omit translation thereof. For example, when the nationality of the second user is France, it may be determined that the second user understands the word 'baguette' uttered in Korean, and thus translation thereof may be omitted.

Also, information about an environment in which translation is performed (hereinafter referred to as 'environment information') included in the first information may include information indicating physical and/or mental circumstance(s) when translation is performed. In detail, the environment information may include a schedule appointment for performing translation, a location of the first user and/or the second user, a topic of conversation between the first user and the second user, a relationship between the first user and the second user, information about ambient noise in an environment in which translation is performed, etc.

In detail, the electronic device 400 may determine whether to omit translation of at least one word of at least one word included in the first speech signal, depending on the importance of a schedule appointment and a location for performing translation. For example, when the schedule appointment for performing translation is a business meeting, the electronic device 400 needs to precisely translate all the details, and thus omission of translation may be minimized to translate all the details.

In another example, the electronic device 400 may adjust the level of summarization or omission of translation by taking at least one of a location of the first user and/or second user, a topic of conversation between the first user and the second user, and a relationship between the first user and the second user into account. For example, in the case of translation for a conversation between friends, the electronic device 400 may set a detail level of translation to a low level, thereby increasing levels of summarization and omission of translation.

Also, considering ambient noises of an environment in which translation is performed, the electronic device 400 may determine that the second user may more likely fail to correctly recognize utterance of the first user when the level of the ambient noise is high. In this case, the electronic device 400 may set the detail level of translation high, change the volume of an audio output of a translated result, or highlight the size and color of a text regarding the translated result.

In addition, when the electronic device 400 is an electronic device frequently used by the second user, e.g., a mobile phone owned by the second user, the first information may include information stored in the electronic device 400.

Here, the information stored in the electronic device 400 may be a memo input by the second user, a document transmitted by the second user, the title of a movie and/or a song stored in the electronic device 400, names stored in a contact list, etc.

For example, when the second user inputs a memo via the electronic device 400 and the memo is stored in a personal file of the electronic device 400, it may be determined that the second user already understand words or sentences formed in the first language included in the memo. Accordingly, based on the memo stored in the electronic device 400, the electronic device 400 may omit translation of certain words or sentences included in the memo.

Referring to FIG. 5, the first information, which is information indicating the level of understanding of the first language of the second user, may include a language understanding history 522.

Here, the language understanding history 522 is information indicating a history indicating the level of understanding of the first language of the second user. The language understanding history 522 may be continuously updated when the second user is provided with a translated result, when a conversation between the first user and the second user is made, or when the second user uses (listen, write, speak, etc.) the first language.

The processor 420 may learn a translation history associated with the second user and update the first information. In detail, the processor 420 may learn histories of translation when the second user is provided with the translated result, when a conversation between the first user and the second user is made or when the second user uses (listen, write, speak, etc.) the first language, and continuously renew the first information including the language understanding history 522.

In addition, the language understanding history 522 may include histories for a certain period. For example, the language understanding history 522 may include a history of the usage of the first language by the second user for the last three months based on a current time.

For example, the language understanding history 522 may include a history of conversations between the second user and another user (e.g., the first user) uttering the first language, a history of the usage of the first language by the second user, etc.

For example, when the first language is English and the second user has been hearing the sentence 'How may I go to city hall?' and provided a translated result thereof three times or more during the last week, the history may be stored as the language understanding history 522 through learning based on frequency of usage. The electronic device 400 may determine that the second user understands the sentence 'How may I go to the city hall?' by referring to the language understanding history 522 and omit translation of the sentence 'How may I go to the city hall?.'

In addition, the first information may include information that the second user input after hearing utterance of the first user, which is a conversation partner, in correspondence to utterance of reception of the first speech signal. Hereinafter, the information input by the second user in correspondence to the reception of the first speech signal will be referred to as 'second user input information.' When second user input information 561 is received, the electronic device 400 may determine that the second user has understood the first speech signal and may not perform translation or omit translation of at least one word, at least one phrase, or at least one sentence included in the first speech signal.

In detail, the second user input information 561 may be received in the form of a speech, a touch pattern, a gesture, and a memo. In detail, when a first speech signal is received, the second user may input at least one of a speech, a touch pattern, a gesture, and a memo indicating that the second user understands the meaning of at least one word included in the first speech signal to the electronic device 400.

For example, when the second user successively touches a touch screen included in the user input unit 440 for a certain number of times or drags on the touch screen in a certain pattern, the electronic device 400 may receive the corresponding touch pattern as user input information.

In another example, when a first speech signal is received, that is, when the first user utters and the second user utters '오케이,' '응,' etc. in respond thereto, the electronic device 400 receives '오케이,' '응,' etc. uttered by the second user through the user input unit 440, determines that, since the second user understands at least one word corresponding thereto, translation thereof is not needed, and may omit the translation thereof.

Alternatively, when the second user makes a nodding gesture, the electronic device 400 may recognize the nodding gesture as user input information.

Here, a user of the electronic device 400 may set a type of inputting method of the second user input information 561 through the user input unit 440. In detail, a type of inputting method of the second user input information 561 includes inputting methods via a speech, a touch pattern, a gesture, and a memo, etc. Here, the user may include a person using an electronic device 400 including the second user, e.g., the owner of the electronic device 400.

Alternatively, the second user input information 561 may be autonomously set by the processor 220 of the electronic device 400. In detail, when an automatic speech translation service is started, the electronic device 400 may inform the second user of the set type of the second user input information 561. For example, when the electronic device 400 initiates an automatic voice translation service as a conversation begins between the first user and the second user, a guidance message output as speech, e.g., 'please say 'yes' to a word (or a sentence) you understand.' In addition, the guidance message may be output through a user interface screen or the like in addition to speech.

Also, while the first speech signal is being received, when no user input information is received, the electronic device 400 may translate and output the entire first speech signal without summarization or omission of translation.

In addition, the second user may input the second user input information (561) word-by-word, phrase-by-phrase, or sentence-by-sentence. In addition, the second user may input user input information on the basis of meaning unit or reading unit of sentences. Summarization or omission of translation according to user input information will be described below in detail with reference to FIG. 8.

Referring again to FIG. 5, a block 520 is for describing an operation for determining whether a user understands at least one word included in a first speech signal. A block 550 is for describing an operation for determining whether to omit translation of at least one word included in the first speech signal based on a result of the determination of whether the user understands. Since a user profiling 523 of FIG. 5 corresponds to the user profiling 623 described above in FIG. 6, descriptions identical to those given above will be omitted.

For example, the electronic device 400 may determine whether the second user understands the first speech signal in the second language based on the first information including at least one of the second user input information 561, the language understanding history 522, language proficiency 524 of the second user, and the user profiling 523. In detail, the processor 420 of the electronic device 400 may determine whether the second user understands the first speech signal in the second language.

Then, the electronic device 400 may determine, based on the first information, the number of words to omit from among at least one word included in the first speech signal (operation 555). Here, omission of translation may be performed on the basis of a word, on the basis of a phrase including at least one word, or on the basis of a sentence including at least one word.

Omission of translation of an entire first speech signal constituting a certain unit, for example, a sentence or a phrase, may be referred to as 'omission of translation 551,' and providing summary of translation of translation of a first speech signal by omitting the translation of at least one word included in the first speech signal may be referred to as 'summarization of translation 552.' In addition, omission and summarization of translation may each include a plurality of levels depending on degrees of omission of words, sentences, etc. included in the first speech signal. For example, when the degree of omission is increased, the level of summarization of translation increases. On the other hand, when the degree of omission is decreased, the level of summarization of translation decreases.

The electronic device 400 may determine whether to omit or summarize translation and perform translation on the first speech signal according to a result of the determination.

The electronic device 400 may determine a translation level to be applied to translation of the first speech signal based on first information, which is information related to the second user, and may translate the first speech signal into the second language according to the determined translation level. Then, the processor 220 translates the first speech signal into the second language based on the result of the above-described determination.

In detail, the electronic device 400 may determine a translation level that indicates a degree of summarization or omission for translating the first speech signal based on the first information. Then, according to the determined translation level, the first speech signal may be translated into the second language.

In addition, the electronic device 400 may set a plurality of translation levels that are distinguished according to degrees of summarization or omission for translating the first speech signal based on the first information. That is, the electronic device 400 may set a plurality of translation levels based on how many of at least one word included in the first speech signal are to be omitted, based on the first information. Then, when the electronic device 400 selects a certain translation level among the plurality of translation levels, e.g., a first translation level, based on the first information, the electronic device 400 may perform translation of the first speech signal according to the selected translation level.

In addition, the electronic device 400 may perform an operation through an artificial neural network to set the plurality of translation levels. In addition, the electronic device 400 may perform an operation through an artificial neural network to select the first translation level from among the plurality of translation levels.

A translation level may be divided into a plurality of stages, such as the plurality of translation levels, according to degrees of summarization of translation. For example, a translation level of 0 indicates no translation and indicates that translation of the first speech signal is completely omitted. Furthermore, translation levels of 1 to N indicate levels for providing summarized translations by omitting the translation for portions of the first speech signal. The translation level may become close to N as translation is performed to details of the first speech signal. On the other hand, as translations of more portions of the first speech signal are omitted, the translation level may become close to 1.

For example, when the electronic device 400 determines that the second user understands the meaning of the entire first speech signal based on the first information, the electronic device 400 does not perform translation. That is, the electronic device 400 may determine that the translation level is 0, and thus the electronic device 400 may skip translation of the entire first speech signal.

When the at least one word included in the first speech signal includes a word that the second user understands, the electronic device 400 may perform translation except for the corresponding word. Alternatively, when the first speech signal includes a sentence pattern that the second user understands, translation may be performed except for the corresponding sentence pattern.

Detailed descriptions of a plurality of translation levels will be given below with reference to FIG. 10B and FIG. 11.

In another example, when the electronic device 400 determines that the first speech signal is in a language that the second user encounters for the first time based on the language understanding history 522, omission or summarization of translation may be minimized to translate the first speech signal in detail.

In addition, the electronic device 400 may determine whether to omit at least one word of at least one words included in an input speech signal based on the utterance characteristics of a speech signal 563 input by the first user. Here, the speech signal 563 shown in FIG. 5 represents a first speech signal to be translated.

In detail, the processor 420 of the electronic device 400 may determine whether to omit translation of at least one word of at least one word included in the first speech signal based on the utterance characteristics of the first user and translate the first speech signal into the second language.

Here, the utterance characteristics of the first user may include information related to the first user's utterance of the first speech signal including at least one of an uttering speed, an utterance length, a pronunciation, an intonation, and a country of origin of the first user.

The electronic device 400 may determine the level of understanding of the second user regarding the first speech signal according to at least one of an uttering speed, an utterance length, a pronunciation, an intonation, and a country of origin. For example, when the first user, who is a non-native speaker, utters with an unusual accent, the electronic device 400 determines that the second user does not understand the first speech signal of the first user. Accordingly, the electronic device 400 may perform translation on the entire first speech signal without omission.

Also, in a conversation between the first user and the second user, as a conversation speed is slow or the lengths of uttered sentences increase, the degree of omission of translation may be increased.

In addition, the processor 420 of the electronic device 400 may recognize at least one of an uttering speed, an utterance length, a pronunciation, and a language through speech information processing (operation 553) of the first speech signal of the first user. In detail, the processor 420 may learn the first speech signal of the first user and determine the level of understanding of the second user according to characteristics of the first speech signal.

For example, the processor 420 via AI may deep-learn the first speech signal of the first user, classify the degree of summarization allowed according to characteristics of the first speech signal of the first user, and may summarize and translate the first speech signal according to the classified degree of summarization. In detail, the processor 420 may receive the first speech signal of the first user and learn the characteristics of the first speech signal. In other words, the processor 420 via AI may learn the characteristics of the first speech signal, thereby learning criteria regarding degrees for summarizing translation of the first speech signal. Then, a summarized translation of the first speech signal may be performed according to the learned criteria.

In addition, the electronic device 400 may output important keywords, phrases, or sentences to be distinguished from unimportant words, phrases, or sentences for outputting a translated result based on the first information. For example, when the output unit 430 of the electronic device 400 outputs a translated result as text through the display 433, important keywords may be displayed in different color or size or highlighted. Also, when the output unit 430 of the electronic device 400 outputs a translated result through the speaker 431, important keywords may be output in increased volume or translated results of the important keywords may be repeatedly output for a certain number of times.

Figure 7:
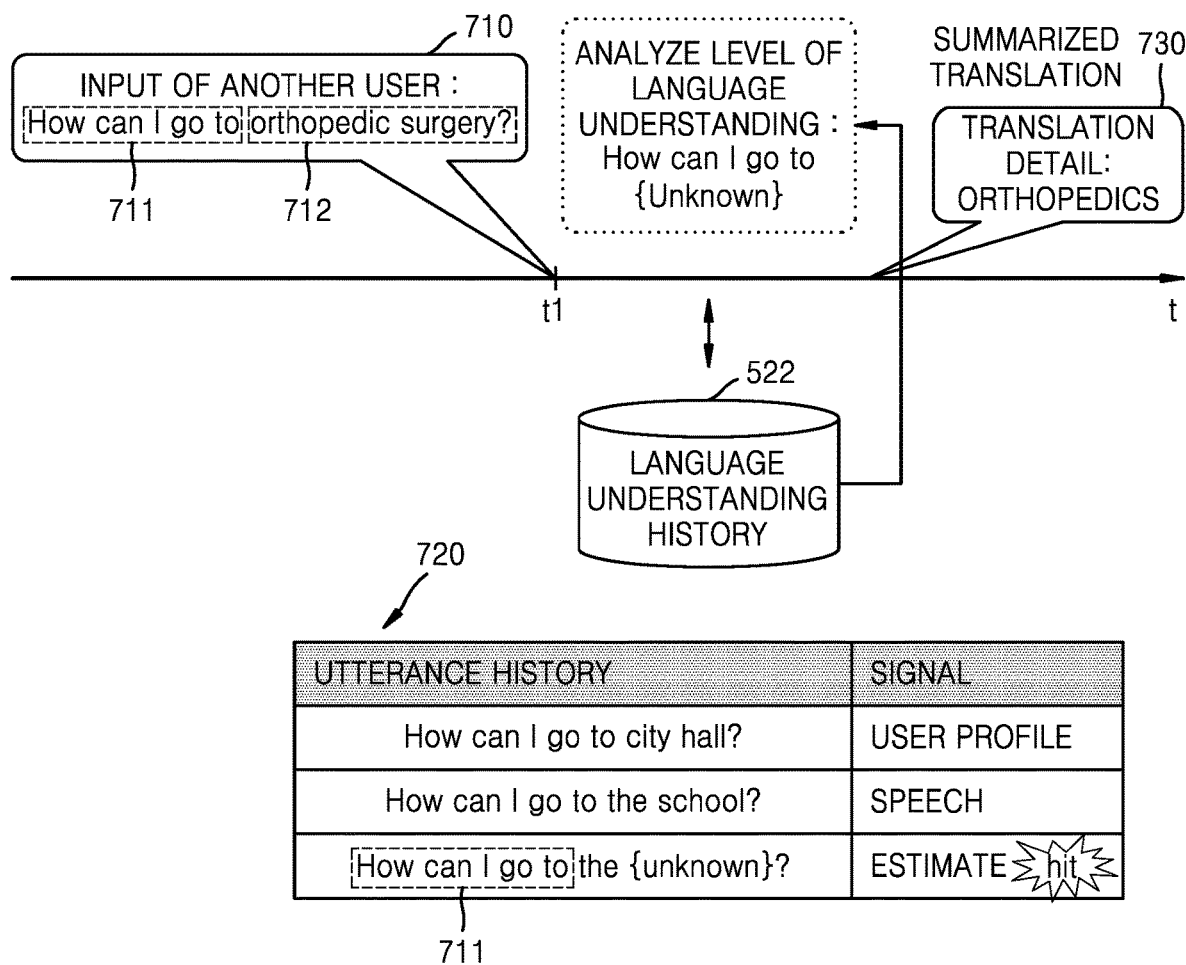
FIG. 7 is a diagram for describing a translating operation according to an embodiment of the disclosure.

FIG. 7 is a diagram for describing a translating operation according to an embodiment of the disclosure.

In detail, FIG. 7 shows an operation for translating a speech signal of a first user.

Referring to FIG. 7, when the first user utters 'How may I go to the orthopedics clinic?' at a time point t1, the electronic device 400 receives a first speech signal 710 corresponding to 'How may I go to orthopedics clinic?' uttered by the first user and speech-recognizes the first speech signal. Then, the electronic device 400 determines whether to omit at least one word of at least one words included in the first speech signal, which is speech-recognized, based on first information, which is information related to a second user. In detail, the electronic device 400 determines, based on the first information, whether the second user understands at least one word included in the first speech signal. In detail, the first information may include information indicating the language understanding history 522 described above with reference to FIGS. 5 and 6. In FIG. 7, a case in which the first information includes information included in a table 720 is exemplified.

Referring to FIG. 7, the table 720 shows histories of speech signals uttered by other users, the speech signals that the second user has been provided with translated results. Referring to the table 720, there is the sentence 'How may I go to city hall?,' which is determined as a sentence that the second user already understands through the user profiling 623 described in FIG. 6. Also, there is the sentence 'How can I go to the school?,' for which the second user input information 561 indicating that the sentence has been previously uttered by another user and the second user has been previously provided with a translated result thereof, e.g., a speech signal 721 input by the second user to indicate that the second user understands the sentence after hearing the first speech signal, has been received.

Then, the electronic device 400 determines that the second user understands 'How can I go to ~?' part 711 based on the first information and decide to omit translation of 'How can I go to ~?' part 711. In detail, the electronic device 400 may estimate that the second user understands 'How can I go to ~?' part 711 based on a result of learning based on first information including information about the user profiling 623 as shown in the table 720 and the second user input information 561 including the speech signal 721.

Accordingly, the electronic device 400 may output '정형외과' 730, which is a result of translating only an 'orthopedics clinic' part, which is determined that the second user does not understand.

As described above, the electronic device 400 may output a translated result more quickly and concisely by omitting the translation of parts that the second user understands. Accordingly, the electronic device 400 may quickly provide a translated result to the second user by minimizing a delay that may occur in performing an automatic speech translation. In addition, the second user may only receive a translated result for a part that he or she does not understand. Accordingly, the second user may reduce the time and effort for reading or hearing a translated result that he already understands.

Figure 8:
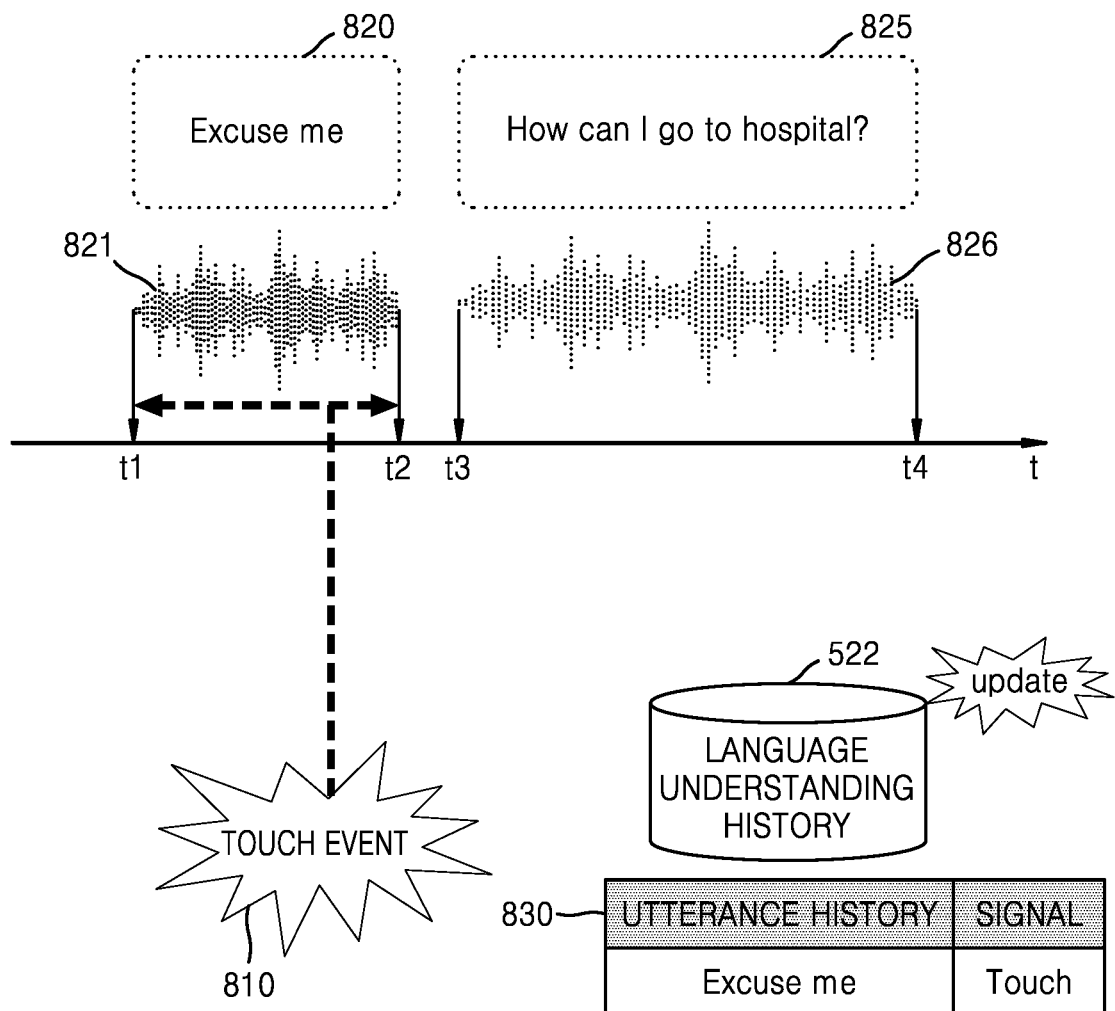
FIG. 8 is a diagram for describing a translating operation according to an embodiment of the disclosure.

FIG. 8 is a diagram for describing a translating operation according to an embodiment of the disclosure. In detail, FIG. 8 is a diagram showing a translating operation based on first information when the first information includes user input information. In FIG. 8, a case where the user input information is a touch event that a touch screen (not shown) is touched once will be exemplified.

Referring to FIG. 8, the first user utters an 'Excuse me' part 820 between a time point t1 and a time point t2 and subsequently utters 'How can I go to the hospital?' part 825 between a time point t3 and a time point t4. Accordingly, the electronic device 400 receives a first speech signal including a speech signal corresponding to 'Excuse me' part 820 and a speech signal corresponding to 'How can I go to the hospital?' part 825. The second user hears 'Excuse me' part 820 uttered by the first user has uttered and may input the touch event 810 to the electronic device 400 to indicate that the second user understands the meaning thereof. Here, the touch event 810 is information included in the first information and corresponds to the second user input information 561 described in FIG. 5.

The electronic device 400 may omit translation of 'Excuse me' part 820 and translate only 'How can I go to the hospital?' part 825 based on the touch event 810. In addition, the electronic device 400 may update an utterance history 830 to the language understanding history 522 after the touch event 810 is input. Then, when a speech signal corresponding to 'Excuse me' is received at a later time point, the electronic device 400 may determine that the second user understands 'Excuse me' and omit translation thereof.

Figure 9A:
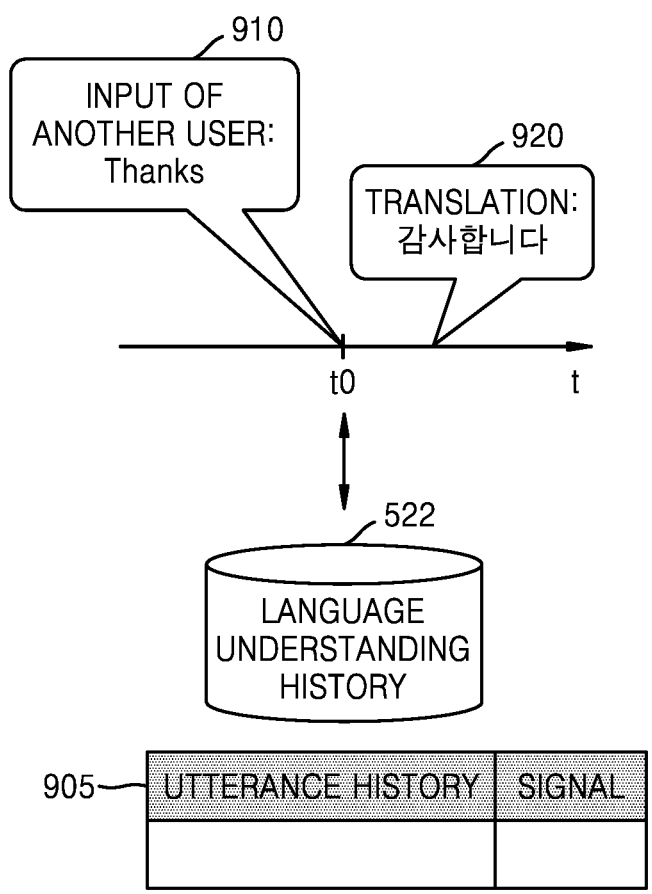
FIGS. 9A to 9C are diagrams for describing a translating operation according to an embodiment of the disclosure.
Figure 9B:
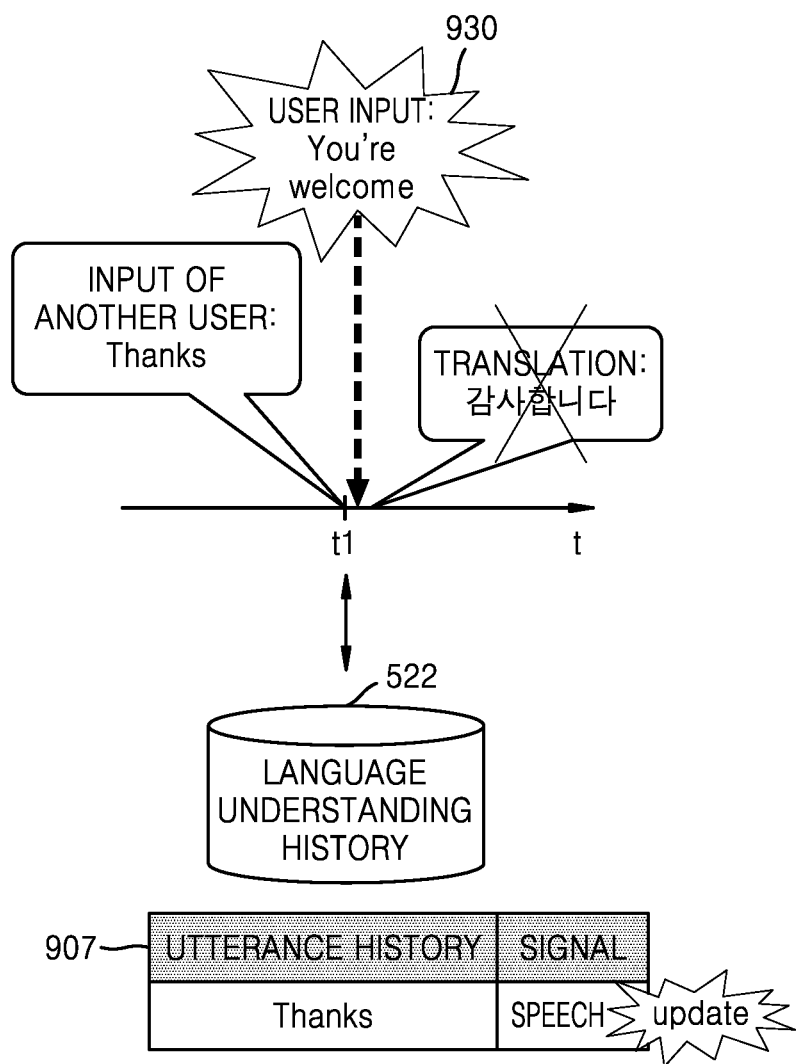
Figure 9C:
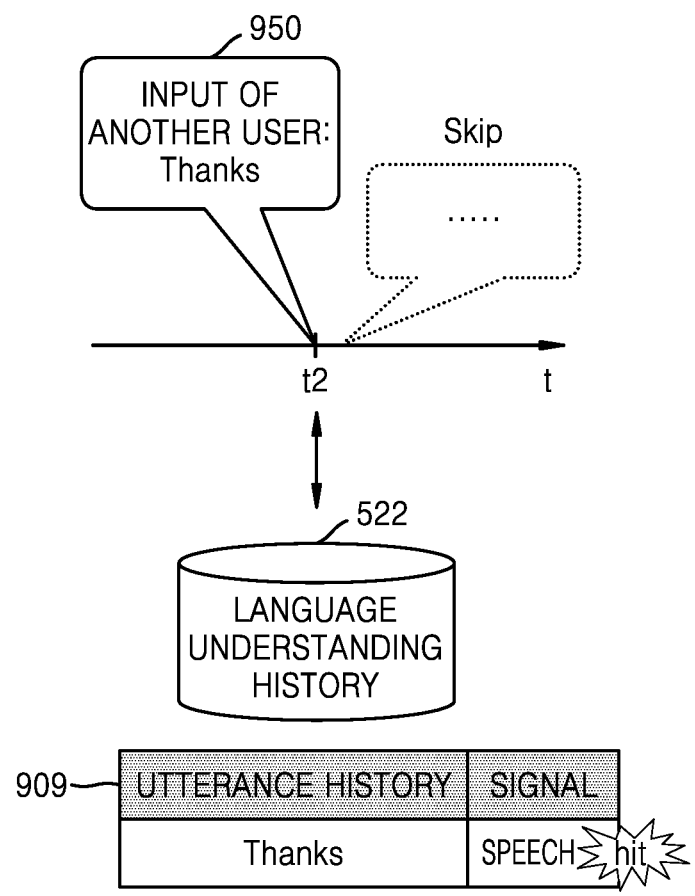

FIGS. 9A to 9C are diagrams for describing a translating operation according to an embodiment of the disclosure. In detail, FIGS. 9A to 9C show omission or summarization of translation based on first information. In FIGS. 9A to 9C, the time point t1 is a time point subsequent to a time point t0, and the time point t2 is a time point subsequent to the time point t1.

Referring to FIG. 9A, when the first user utters a 'Thanks' part 910, the electronic device 400 receives a speech signal corresponding to 'Thanks' part 910. The electronic device 400 determines whether to omit translation for "Thanks" based on the language understanding history 522 included in the first information. In this example, the language understanding history 522 includes an utterance history 905 before the time point t0. Since there is no history of performing translation for 'Thanks' in the utterance history 905 and there is no history indicating that the second user understands the Korean meaning of the word 'Thanks,' the electronic device 400 determines that the second user does not understand 'Thanks' and outputs a '감사합니다' part 920 as a translated result.

Referring to FIG. 9B, the electronic device 400 updates an utterance history 907 included in the language understanding history 522 to reflect a history of the translation performed in FIG. 9A.

Referring to FIG. 9B, when the first user utters 'Thanks' at the time point t1, the electronic device 400 receives a speech signal corresponding to 'Thanks.' The second user hears the speech signal corresponding to 'Thanks' and may utter 'You're welcome' part 930 as a corresponding answer. In this case, the electronic device 400 may determine to omit translation of 'Thanks' based on 'You're welcome' part 930, which is information input by the second user in response to the reception of the speech signal corresponding to 'Thanks.' Accordingly, the electronic device 400 may not output a translated result. When the electronic device 400 omits translation corresponding to a received speech signal, the electronic device 400 may output a notification message. For example, the electronic device 400 may output an audio signal corresponding to 'pass,' 'skip,' or a certain alarm sound or may output a message screen including 'omit translation.' Also, the electronic device 400 updates the utterance history 907 included in the language understanding history 522 to reflect a history of translation performed in FIG. 9B. The processor 420 may learn the updated utterance history 907 and determine that the second user understands the meaning of 'Thanks.'

Referring to FIG. 9C, when the first user utters a 'Thanks' part 950 at the time point t2, the electronic device 400 receives a speech signal corresponding to 'Thanks' part 950. The electronic device 400 determines whether to omit translation for "Thanks" based on the language understanding history 522 included in the first information. In this example, the language understanding history 522 includes an utterance history 909 before the time point t2. Since the utterance history 909 has a history indicating that the second user understands 'Thanks,' the electronic device 400 may determine that the second user understands 'Thanks' and decide to omit translation thereof.

Figure 10A:
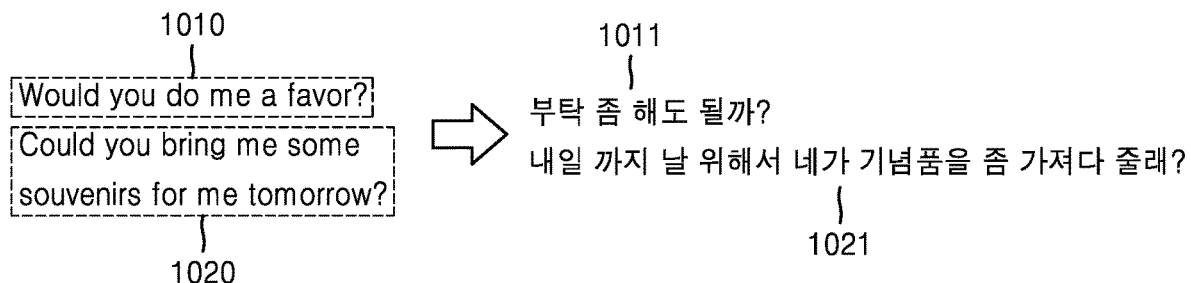
FIG. 10A is a diagram for describing a translating operation according to an embodiment of the disclosure.

FIG. 10A is a diagram for describing a translating operation according to an embodiment of the disclosure.

Referring to FIG. 10, the electronic device 400 may receive speech signals corresponding to a 'Would you do me a favor?' part 1010 and a 'Could you bring me some souvenirs for me tomorrow?' part 1020 uttered by the first user.

When the electronic device 400 performs a translation of at least one word included in the speech signal without omitting translation, the electronic device 400 may output a '부탁 좀 해도 될까' part 1011 as a translated result corresponding to 'Would you do me a favor?' part 1010 and output a '내일까지 날 위해서 내가 기념품을 좀 가져다 줄래?' part 1021 as a translated result corresponding to 'Could you bring me some souvenirs for me tomorrow?' part 1020.

Figure 10B:
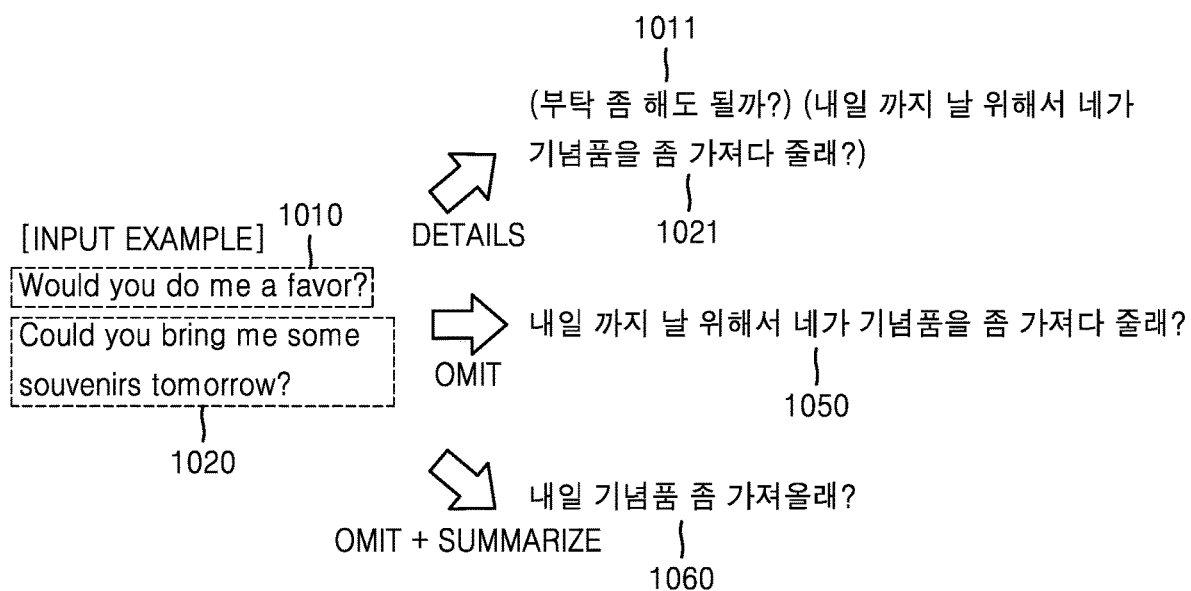
FIG. 10B is a diagram for describing summarization or omission of translation according to an embodiment of the disclosure.

FIG. 10B is a diagram for describing summarization or omission of translation according to an embodiment of the disclosure. FIG. 10B shows an example of performing a translation by omitting at least one word included in the speech signal described in FIG. 10A.

Referring to FIG. 10B, the electronic device 400 may determine whether to omit translation of at least one word included in the speech signal based on the first information and output a translated result accordingly.

In detail, the electronic device 400 may determine, based on the first information, how many of at least one words included in the speech signal are to be omitted and performs a translation based on a result of the determination.

In this case, it is expressed as 'determining how many of at least one word included in the speech signal are to be omitted.' However, the expression indicates a degree of summarization of translation for at least one sentence included in a first speech signal rather than the number of words to be omitted. That is, when the number of omitted words increases, a more summarized translated result will be output. On the contrary, when the number of omitted words decreases, a less summarized translated result will be output.

FIG. 10B shows an example in which three translation levels are set according to degrees of summarization or omission in translation of a speech signal. For example, the electronic device 400 may set three translation levels including a first translation level to translate an input speech signal like the parts 1011 and 1021, a second translation level to translate an input speech signal like a part 1050, and a third translation level to translate an input speech signal like a part 1060. For example, when the electronic device 400 determines to perform a translation without omitting at least one word included in a speech signal based on the first information, the electronic device 400 outputs '부탁 좀 해도 될까?' part 1011 and '내일까지 날 위해서 내가 기념품은 좀 가져다 줄래?' part 1021.

Also, when the electronic device 400 decides to omit translation of 'Would you do me a favor?' part 1010 included in the speech signal based on the first information, the electronic device 400 may output a '내일까지 날 위해서 내가 기념품을 좀 가져다 줄래?' part 1050, which is a translated result corresponding to 'Could you bring me some souvenirs for me tomorrow?' part 1020.

Also, when the electronic device 400 determines to omit translation of 'Would you do me a favor?' part 1010 included in the speech signal based on the first information and summarize translation of 'Could you bring me some souvenirs tomorrow?' part 1020, the electronic device 400 may lower the detail level of translation and output a "내일 기념품 좀 가져올래?" part 1060 as a translated result.

As described above with reference to FIG. 10B, the electronic device 400 may determine a degree to which the second user understands the second language meaning of the first speech signal formed in the first language based on the first information and perform speech omission and/or summarization of translation for the speech signal.

Figure 11:
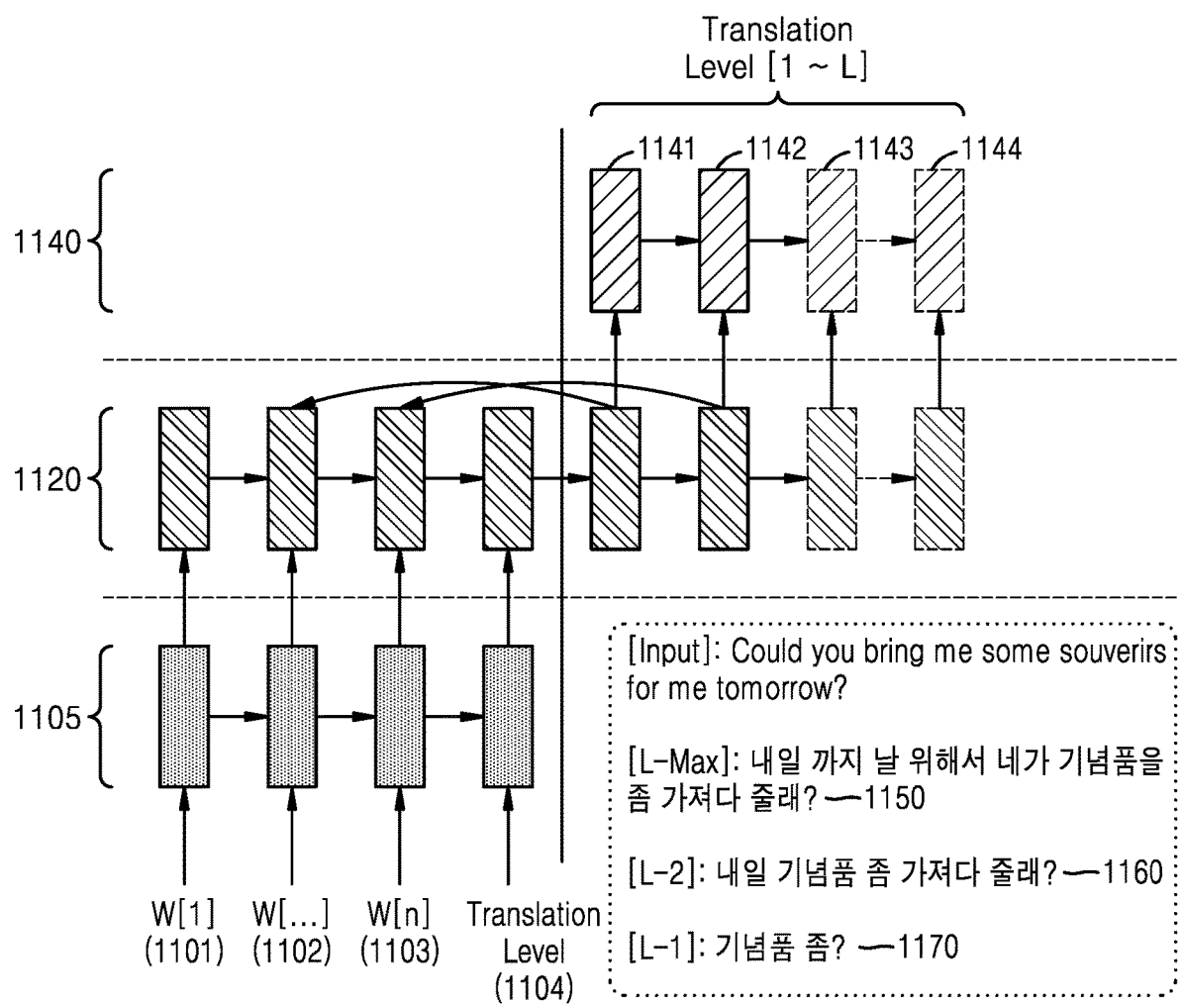
FIG. 11 is a diagram for describing summarization or omission of translation based learning through a neural network according to an embodiment of the disclosure.

FIG. 11 is a diagram for describing summarization or omission of translation based learning through a neural network according to an embodiment of the disclosure.

The electronic device 400 may set a plurality of translation levels and select a first translation level from among the translation levels based on first information. Then, the electronic device 400 may perform translation for a first speech signal according to the first translation level. In detail, the electronic device 400 may set a plurality of translation levels corresponding to degrees of language understanding based on information indicating degrees of language understanding for each of a plurality of users through an operation via the artificial neural network. When a translation service for a particular user, i.e. a second user, is needed, the electronic device 400 may perform an operation through an artificial neural network and, based on the first information indicating the degree of language understanding of the second user, select a certain translation level from among the translation levels.

Here, a plurality of translation levels may be distinguished from one another according to the degrees of summarization or omission of translation as described above. For example, a plurality of translation levels may include a full translation level L-Max, a partial summarization level L-2, and a full summarization level L-1. Then, the electronic device 400 performs translation according to a determined translation level.

In detail, the processor 420 of the electronic device 400 may perform learning through a neural network and output translated results, which are output data, differently according to a result of learning using the first information and the first speech signal as input data.

In detail, translation levels may be included in training data and reflected to a training for providing translated results. The processor 420 may provide distinct results of translation depending on learned degrees of summarization or omission of translation as described above.

For example, referring to FIG. 11, the processor 420 trains an artificial intelligence network by including translation levels in training data.

FIG. 11 schematically shows a neural network having a structure including a plurality of layers.

Referring to FIG. 11, the artificial neural network may include an input layer 1105, a hidden layer 1120, and an output layer 1140. In addition, operations through the artificial neural network may be performed within the processor 420. Alternatively, operations through the artificial neural network may be performed through a processor, a controller, or a chip for performing operations through the artificial neural network, separate from the processor 420.

In FIG. 11, data input through the input layer 1105 may be first speech signals 1101, 1102, and 1103 and information 1104 indicating a translation level. That is, the artificial neural network may include the input layer 1105, the hidden layer 1120, and the output layer 1140. Here, each of the speech signals 1101, 1102, and 1103 corresponds to a 'semantic unit' having a certain meaning and may include words, phrases, clauses, or sentences.

Here, the information 1104 indicating a translation level may be information indicating a translation level classified through learning or may be first information for determining a translation level. When the information 1104 is information indicating a translation level classified through learning, the processor 420 may learn using input information, which are the first speech signals 1101, 1102, and 1103 and the information 1104, in a next layer, i.e. the hidden layer 1120, and generate a translated result. And, when the information 1104 is the first information for determining a translation level, the processor 420 may learn the first information and determine a translation level to be applied to a translation to be performed. Then, the processor 420 may learn the determined translation level and the first speech signals 1101, 1102, and 1103 and generate a translated result.

Also, in FIG. 11, weights between layers and nodes are updated through learning and training performed at the hidden layer 1120. For example, the processor 420 may obtain weights W[1], W[ . . . ], and W[n] to be respectively applied to the first speech signals 1101, 1102, and 1103, which are input signals, through repeated learnings. Then, the weights W[1], W[ . . . ], and W[n] may be respectively applied to the first speech signals 1101, 1102, and 1103, which are input signals, and thus the trained neural network may generate translated results with varying sentence lengths according to translation levels. Therefore, even when a same sentence is input, translated results with different degrees of summarization and difference sentence lengths may be generated according to translation levels. Referring to FIG. 11, some semantic units 1141 and 1142 from among translated results corresponding to the first speech signals 1101, 1102, and 1103 output from the output layer 1140 are output as translated results, and some semantic units 1143 and 1144 are omitted and not output as translated results.

For example, the electronic device 400 may apply a weight value of 1 to a semantic unit that do not exist in a language understanding history and may apply a weight value of −1 for every use of a semantic unit in the language understanding history. Then, based on the weight value, degree of omission of a semantic unit may be determined according to a translation level.

In detail, the electronic device 400 may apply a weight to each of words, phrases, or sentences included in input first speech signal and perform translation thereof by applying any one of a plurality of translation levels based on the weight value.

Referring to FIG. 11, 'Could you bring me some souvenirs tomorrow?' Is input to the electronic device 400. The electronic device 400 determines whether the second user understands the meaning for each of the first speech signals 1111, 1112, and 1113, which are distinct semantic units. In addition, a weight may be applied to at least each semantic unit that does not exist in a language understanding history, translation may be performed primarily for a part with a high weight, and translation may be omitted for a part with a low weight.

For example, the electronic device 400 may apply a weight value of 1 to a semantic unit that do not exist in a language understanding history and may apply a weight value of −1 for every use of a semantic unit in the language understanding history. Then, based on the weight value, degree of omission of words may be determined according to a translation level.

For example, the electronic device 400 may output a '내일까지 날 위해서 네가 기념품을 좀 가져다 줄래?' part 1150 like the part 1050, at the full translation level L-Max. Since the translation level is the full translation level L-Max, a maximum length translated result is provided.

Also, at the partial summarization level L-2, the electronic device 400 may provide translated results with translation lengths suitable for the corresponding level based on weights for semantic units in an artificial neural network. Therefore, translation of some semantic units may be omitted, and thus a '내일 기념품 좀 가져다 줄래?' part 1160 may be output. In addition, at the full summarization level L-1, the electronic device 400 may output a translated result that is further summarized, that is, a '기념품 좀?' part 1170.

In addition, although the electronic device 400 may determine a translation level based on first information, the electronic device 400 may also determine a translation level according to a user input. For example, when a user requests a translation according to a particular translation level through the user input unit 440, the electronic device 400 may determine a degree of summarization or omission of translation according to the translation level.

As described above, the electronic device for translating a first speech signal, which is formed in a first language and uttered by a first user, into a second language and providing a translated result to a second user determines a degree of omission or summarization of translation based on first information, which is information related to the second user, thereby omitting the translation of parts that does not need to be provided to the second user. Accordingly, a delay time of automatic speech translation may be minimized, thereby more quickly outputting a translated result. Also, a translated result that is optimized, concise, and clear may be output to the second user who receives the translated result.

Figure 12:
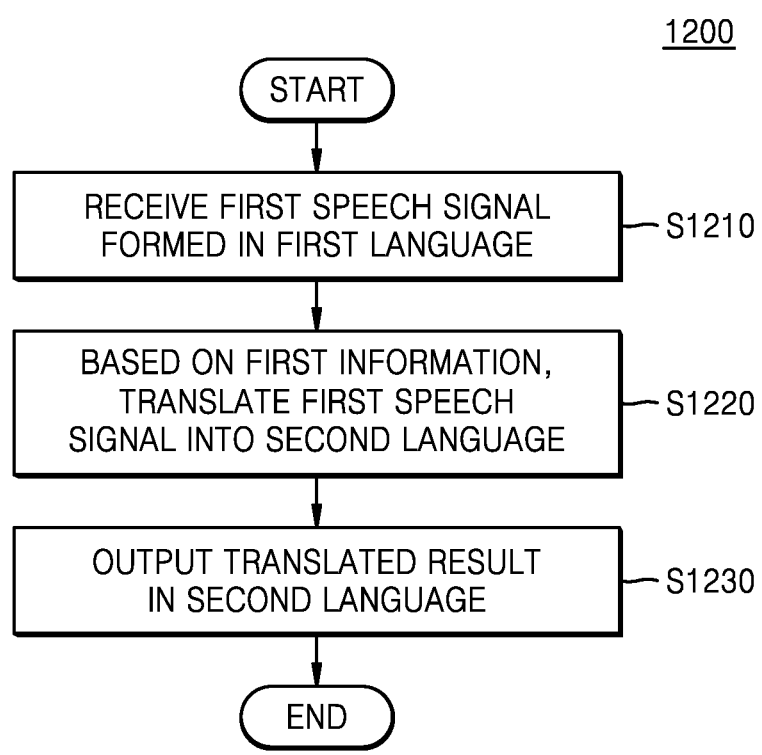
FIG. 12 is a flowchart of a method of translating a speech signal, according to an embodiment of the disclosure.

FIG. 12 is a flowchart of a method of translating a speech signal according to an embodiment of the disclosure. Operations included in the method 1200 of translating a speech signal shown in FIG. 12 are identical to operations performed in the electronic device 200 or 400 according to the embodiment of the disclosure described above with reference to FIGS. 1 to 11. Therefore, in describing the method 1200 of translating a speech signal according to an embodiment of the disclosure, descriptions identical to those given above with reference to FIGS. 1 to 11 will be omitted.

The method 1200 of translating a speech signal is a method of translating a first speech signal, which is uttered by a first user in a first language, into a second language and providing a translated result to a second user.

In the method 1200 of translating a speech signal, a first speech signal including at least one word is received (operation S1210). Operation S1210 may be performed at the receiver 410 of the electronic device 400.

Next, in the method 1200 of translating a speech signal, it is determined whether to omit translation of at least one word of at least one words included in the first speech signal based on first information, which is information related to the second user, and the first speech signal is translated into the second language (operation S1220). The operation S1220 may be performed at the processor 420 of the electronic device 400. In addition, when a translated result is output as speech, the processor 420 may perform speech synthesis on a translated result and output a result of the speech synthesis through the output unit 430.

In the method 1200 of translating a speech signal, a translated result in the second language is output (operation S1230). The operation S1230 may be performed at the output unit 430 of the electronic device 400.

Figure 13:
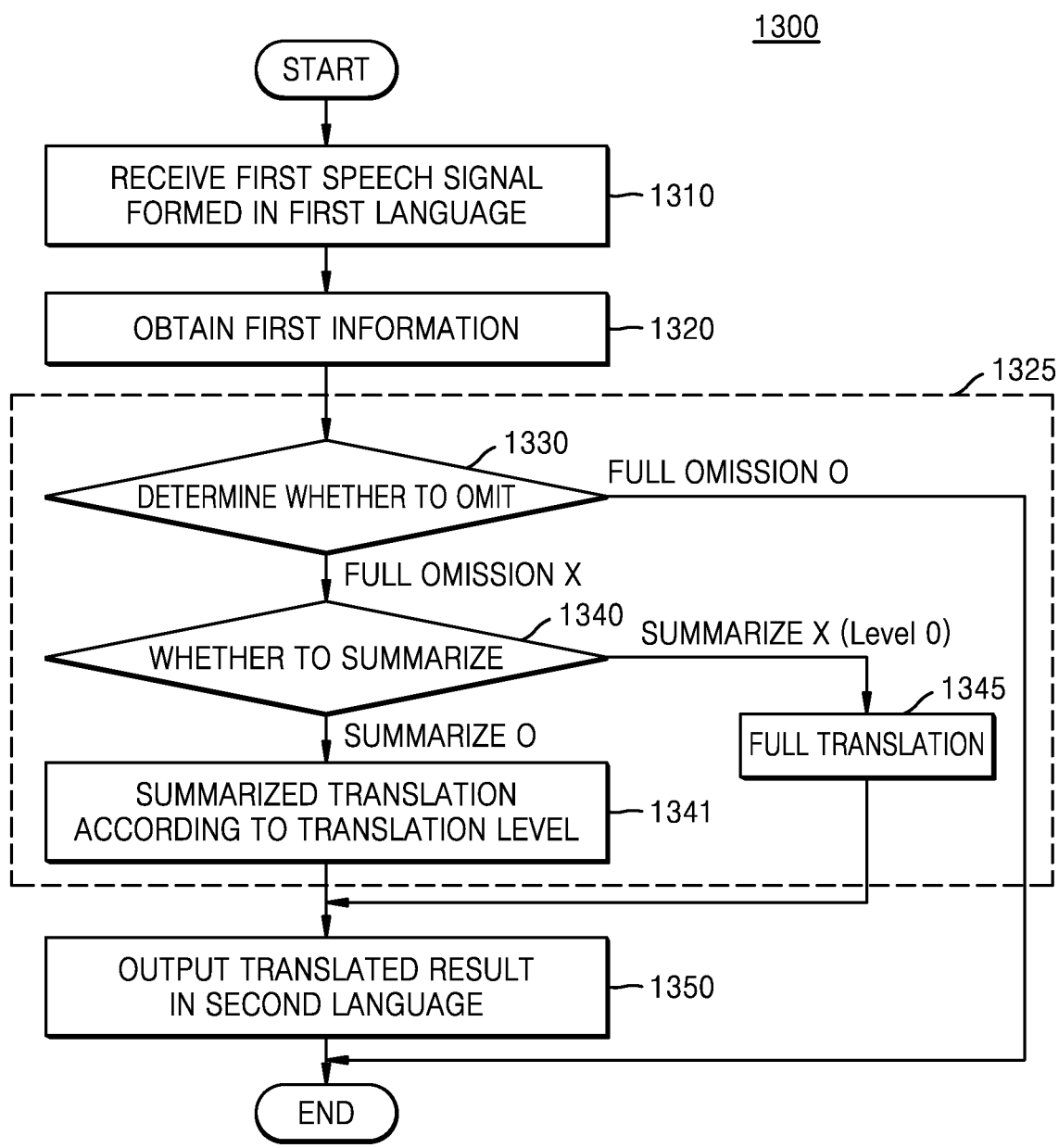
FIG. 13 is a flowchart of a method of translating a speech signal, according to another embodiment of the disclosure.

FIG. 13 is a flowchart of a method of translating a speech signal according to an embodiment of the disclosure. Operations included in a method 1300 of translating a speech signal shown in FIG. 13 are identical to operations performed in the electronic device 200 or 400 according to the embodiment of the disclosure described above with reference to FIGS. 1 to 11. Therefore, in describing the method 1300 of translating a speech signal according to an embodiment of the disclosure, descriptions identical to those given above with reference to FIGS. 1 to 11 will be omitted. Also, operation S1310 in FIG. 13 corresponds to operation S1210 in FIG. 12, operations S1320 and S1325 in FIG. 13 correspond to operation S1220 in FIG. 12, and operation S1350 in FIG. 13 corresponds to operation S1240 in FIG. 12. Therefore, in describing the method 1300 of translating a speech signal, descriptions identical to those given above with reference to FIG. 12 are omitted Referring to FIG. 13, in the method 1300 of translating a speech signal, a first speech signal including at least one word is received (operation S1310). Operation S1310 may be performed at the receiver 410 of the electronic device 400.

In the method 1300 of translating a speech signal, first information that is information related to a second user is obtained (operation S1320). The operation S1320 may be performed at the processor 420 of the electronic device 400.

Next, in the method 1300 of translating a speech signal, it is determined whether to omit translation of at least one word of at least one word included in the first speech signal based on the first information, (operation S1325), and the first speech signal is translated into the second language. Operation of S1325 may be performed at the processor 420 of the electronic device 400.

In detail, in the method 1300 of translating a speech signal, a degree of omission or summarization of translation may be determined based on the first information. In detail, based on the first information, it may be determined whether to omit translation for the first speech signal (operation S1330).

As a result of the determination in operation S1330, in case of partially omitting translation, it may be determined translation of how many words of at least one word included in the first speech signal are to be omitted, that is, a degree of omission of translation (operation S1340). Operations S1330 and S1340 correspond to operation 550 described above with reference to FIG. 5, and thus detailed descriptions thereof will be omitted.

Based on a result of the determination in operation S1340, summarized translation is performed according to a degree of summarization or a translation level corresponding to the degree of the summarization (operation S1341). Also, when it is determined to perform translation without summarization as a result of the determination in operation S1340, translation is performed for the entire first speech signal (operation S1345). Operations S1341 and S1345 correspond to operation 550 that is described above in detail with reference to FIGS. 5, 6, 10, and 11, and thus detailed descriptions thereof will be omitted.

In the method 1300 of translating a speech signal, a translated result in the second language is output (operation S1350). The operation S1350 may be performed at the output unit 430 of the electronic device 400.

A method and an electronic device for translating a speech signal according to an embodiment of the disclosure may minimize a delay time between reception of a speech signal to be translated and output of a translated result.

Also, a method and an electronic device for translating a speech signal according to an embodiment of the disclosure may output a translated result optimized for a user who is provided with the translated result. In detail, a method and an electronic device for translating a speech signal according to an embodiment of the disclosure may output an optimized translated result according to at least one of language understanding, language proficiency, and a surrounding environment of a user who is provided with the translated result.

Also, a method and an electronic device for translating a speech signal according to an embodiment of the disclosure may provide a summarization service optimized to a user and a translation circumstance, like when an interpreter performs simultaneous interpretation.

In detail, for translating a first speech signal, which is uttered by a first user in a first language, into a second language and providing a translated result to a second user, a method and an electronic device for translating a speech signal according to an embodiment of the disclosure may determine a degree of omission or summarization of translation based on first information, which is information related to the second user, thereby omitting the translation of a part that does not need to be provided to the second user. Accordingly, a delay time occurs during an automatic speech translation may be minimized, thereby more quickly outputting a translated result. Also, a translated result that is optimized, concise, and clear may be output to the second user who receives the translated result.

Also, a conversation pattern or a conversation history of a second user, who is provided with a translated result, may be learned by using an artificial neural network, thereby outputting a translated result optimized for the level of language understanding of the second user.

One or more embodiments may be implemented as a computer-readable recording medium storing at least one instructions that can be executed by a computer such as a program module. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium. In addition, some embodiments may be implemented as computer programs or computer program products including instructions executable by a computer, such as computer programs executed by a computer.

The particular implementations described in the disclosure are merely examples and are not intended to limit the scope of the disclosure in any way. For brevity of description, descriptions of electronic configurations according to the related art, control systems, software, and other functional aspects of the systems may be omitted.

What is claimed is:

1. A method of translating a first speech signal in a first language of a speaker into a second speech signal in a second language of a listener, the method comprising:
   receiving, by a receiver, the first speech signal in the first language that is spoken by the speaker;
   determining, by a processor, a translation level, which indicates a degree of summarization or omission of at least one word included in the first speech signal, to be applied to a translation of the first speech signal based on a level of understanding of the first language by the listener receiving translated results in the second language;
   translating, by the processor, the first speech signal in the first language into the second speech signal in the second language according to the translation level; and
   in response to omitting translation for at least one word included in the first speech signal, outputting, by the processor, a message indicating that the translation is skipped.

2. The method of claim 1, wherein the level of understanding of the first language is determined based on at least one of input information of the listener, a language understanding history of the listener, language proficiency of the listener, and profile of the listener.

3. The method of claim 1, wherein the determining the translation level comprises
   determining the translation level based on history information of voice signals to which the listener is provided with the translated results.

4. The method of claim 1, further comprising:
   receiving input information of the listener according to a preset type indicating that the listener understands a meaning of at least one word included in the first speech signal,
   wherein the determining the translation level comprises
   determining the translation level based on the input information of the listener.

5. The method of claim 4, wherein the preset type comprises at least one of a speech, a touch pattern, a gesture, and a memo.

6. The method of claim 4,
   wherein the receiving input information of the listener comprises receiving the input information of the listener in units of words, phrases, or sentences,
   wherein the translating the first speech signal in the first language into the second speech signal in the second language comprises omitting translation for the at least one word based on the input information of the listener.

7. The method of claim 1,
   wherein the translating the first speech signal in the first language into the second speech signal in the second language comprises
   translating the entire first speech signal when input information of the listener, indicating that the listener understands a meaning of at least one word included in the first speech signal, is not received.

8. The method of claim 1, wherein the translation level increases as the translation is performed to a detailed portion of the first speech signal.

9. An electronic device for translating a first speech signal in a first language of a speaker into a second speech signal in a second language of a listener, the electronic device comprising:
   a receiver configured to receive the first speech signal in the first language that is spoken by the speaker; and
   a processor configured to:
   determine a translation level, which indicates a degree of summarization or omission of at least one word included in the first speech signal, to be applied to a translation of the first speech signal based on a level of understanding of the first language by the listener receiving translated results in the second language;
   translate the first speech signal in the first language into the second speech signal in the second language according to the translation level;
   in response to omitting translation for at least one word included in the first speech signal, output a message indicating that the translation is skipped.

10. The electronic device of claim 9, wherein the level of understanding of the first language is determined based on at least one of input information of the listener, a language understanding history of the listener, language proficiency of the listener, and profile of the listener.

11. The electronic device of claim 9, wherein the processor is further configured to determine the translation level based on history information of voice signals to which the listener is provided with the translated results.

12. The electronic device of claim 9,
    wherein the receiver is further configured to receive input information of the listener according to a preset type indicating that the listener understands a meaning of at least one word included in the first speech signal,
    wherein the processor is further configured to determine the translation level based on the input information of the listener.

13. The electronic device of claim 12, wherein the preset type comprises at least one of a speech, a touch pattern, a gesture, and a memo.

14. The electronic device of claim 12,
    wherein the receiver is further configured to receive input information of the listener comprises receiving the input information of the listener in units of words, phrases, or sentences,
    wherein the processor is further configured to omit translation for the at least one word based on the input information of the listener.

15. The electronic device of claim 9,
    wherein the processor is further configured to translate the entire first speech signal when input information of the listener, indicating that the listener understands a meaning of at least one word included in the first speech signal, is not received.

16. The electronic device of claim 9, wherein the translation level increases as the translation is performed to a detailed portion of the first speech signal.

* * * * *